(12) United States Patent
Yamazaki et al.

(10) Patent No.: US 12,736,796 B2
(45) **Date of Patent: *Sep. 15, 2026**

(54) OBSERVATION APPARATUS

(71) Applicant: Evident Corporation, Tatsuno-machi (JP)

(72) Inventors: Kentaro Yamazaki, Kamiina-gun (JP); Kenji Kawasaki, Kamiina-gun (JP); Kenichi Kusaka, Kamiina-gun (JP); Izumi Shomura, Kamiina-gun (JP)

(73) Assignee: Evident Corporation, Kamiina (JP)

( * ) Notice: Subject to any disclaimer, the term of this patent is extended or adjusted under 35 U.S.C. 154(b) by 56 days.

This patent is subject to a terminal disclaimer.

(21) Appl. No.: 18/935,107

(22) Filed: Nov. 1, 2024

(65) Prior Publication Data

US 2025/0060577 A1 Feb. 20, 2025

Related U.S. Application Data

(63) Continuation of application No. 17/849,263, filed on Jun. 24, 2022, now Pat. No. 12,164,099.

(30) Foreign Application Priority Data

Jun. 30, 2021 (JP) ................................ 2021-108359

(51) Int. Cl.
*G02B 21/36* (2006.01)
*G02B 21/00* (2006.01)

(52) U.S. Cl.
CPC ....... *G02B 21/368* (2013.01); *G02B 21/0032* (2013.01); *G02B 21/0044* (2013.01)

(58) Field of Classification Search
CPC .............. G02B 21/368; G02B 21/0032; G02B 21/0044
See application file for complete search history.

(56) References Cited

U.S. PATENT DOCUMENTS 6,292,214 B1 9/2001 Sakano
7,050,225 B2 5/2006 Nakamura
(Continued)

FOREIGN PATENT DOCUMENTS

CA 3066483 * 1/2019
CA 3066483 A1 7/2019
(Continued)

OTHER PUBLICATIONS

Maki translation of JP H0829115 Jul. 18, 1994 (Year: 1994).*
(Continued)

*Primary Examiner* — Zaihan Jiang
(74) *Attorney, Agent, or Firm* — Holtz, Holtz & Volek PC

(57) ABSTRACT

An observation apparatus includes a display apparatus that displays a display pattern, a display projection optical system that projects a light beam from the display apparatus and forms an image of the display pattern, a combining optical element that combines a light beam from a sample and the light beam from the display apparatus, and an eyepiece optical system through which an image of the sample and an image of the display pattern are simultaneously observable by an observer. A numerical aperture (NA) of the light beam from the display apparatus is smaller than a maximum value and larger than a minimum value of an NA of the light beam from the sample, at a position of an image on an optical path that is formed after the light beams from the sample and the display apparatus are combined by the combining optical element.

18 Claims, 21 Drawing Sheets

(56) References Cited

U.S. PATENT DOCUMENTS

| | | | | |
|---|---|---|---|---|
| 9,239,292 | B2 * | 1/2016 | Moertelmaier | G01N 21/6428 |
| 2003/0030899 | A1 | 2/2003 | Nakamura | |
| 2005/0232116 | A1 * | 10/2005 | Misawa | G02B 27/144 369/103 |
| 2006/0083834 | A1 * | 4/2006 | Shah | A23K 50/42 426/518 |
| 2006/0088634 | A1 * | 4/2006 | Shah | A23K 40/25 426/518 |
| 2009/0026369 | A1 * | 1/2009 | Miyai | H01J 37/28 250/310 |
| 2012/0182412 | A1 * | 7/2012 | He | B82Y 35/00 356/72 |
| 2012/0300294 | A1 | 11/2012 | Jess et al. | |
| 2014/0329147 | A1 * | 11/2014 | Mitsumoto | H01M 10/052 429/223 |
| 2020/0326269 | A1 * | 10/2020 | Blandin | G06T 7/62 |
| 2021/0215923 | A1 | 7/2021 | Nakata et al. | |

FOREIGN PATENT DOCUMENTS

| | | | |
|---|---|---|---|
| CN | 102818768 | * | 7/2012 |
| CN | 112703440 | A | 4/2021 |
| JP | H03213816 | A | 9/1991 |
| JP | H0829115 | * | 7/1994 |
| JP | H0829115 | A | 2/1996 |
| JP | H08122647 | A | 5/1996 |
| JP | H1172717 | A | 3/1999 |
| JP | 2003050356 | A | 2/2003 |
| JP | 2003066336 | A | 3/2003 |
| JP | 2009025362 | A | 2/2009 |
| JP | 2010135894 | A | 6/2010 |
| JP | 2012118095 | * | 11/2010 |
| JP | 2012168302 | * | 2/2011 |
| JP | 2012098271 | A | 5/2012 |
| JP | 2012118095 | A | 6/2012 |
| JP | 2012168302 | A | 9/2012 |
| JP | 2021045518 | A | 3/2021 |
| WO | WO-2012135961 | * | 4/2012 |
| WO | 2012135961 | A1 | 10/2012 |
| WO | 2020066041 | A1 | 4/2020 |

OTHER PUBLICATIONS

Ugiyama translation of JP 2012118095 Nov. 29, 2010 (Year: 2010).*

Nakaya translation of JP 2012168302 Sep. 6, 2012 (Year: 2012).*

Li, Chao-hong translation of CN 102818768 Jul. 31, 2012 (Year: 2012).*

Japanese Office Action (and an English language translation thereof) dated Mar. 18, 2025, issued in counterpart Japanese Application No. 2021-108359.

Japanese Office Action (and an English language translation thereof) dated Aug. 26, 2025, issued in counterpart Japanese Application No. 2021-108359.

* cited by examiner

OBSERVATION APPARATUS

CROSS REFERENCE TO RELATED APPLICATIONS

This application is a Continuation application of U.S. application Ser. No. 17/849,263, filed Jun. 24, 2022, and issued as U.S. Pat. No. 12,164,099, on Dec. 10, 2024, which is based upon and claims the benefit of priority of prior Japanese Patent Application No. 2021-108359, filed Jun. 30, 2021, the entire contents of both of which are incorporated herein by reference.

BACKGROUND OF THE INVENTION

Field of the Invention

The disclosure herein relates to an observation apparatus.

Description of the Related Art

As an example of an observation apparatus, there has been conventionally known a microscope that includes a display apparatus such as a liquid crystal display device, optically overlaps an image of a sample and an image of a display pattern displayed by the display apparatus, and makes the overlapping images simultaneously observable via an eyepiece lens (for example, refer to JP H08-122647 A). In this observation apparatus, by the display apparatus displaying a display pattern indicating information regarding a sample, and the like, sample observation performed by an observer can be aided.

SUMMARY OF THE INVENTION

An observation apparatus according to an aspect of the present invention includes an observation optical system configured to image a light beam from a sample, and form an image of the sample, a display apparatus configured to display a display pattern, a display projection optical system configured to project a light beam from the display apparatus, and form an image of the display pattern at a position at which the image of the sample is formed, a combining optical element configured to combine a light beam from the sample and a light beam from the display apparatus, and an eyepiece optical system configured to enable an observer to simultaneously observe an image of the sample and an image of the display pattern, in which a numerical aperture (NA) of a light beam from the display apparatus is smaller than a maximum value of an NA of a light beam from the sample, and is larger than a minimum value of an NA of a light beam from the sample, at a position of an image on an optical path that is formed after light beams are combined by the combining optical element.

DESCRIPTION OF THE EMBODIMENTS

In the conventional observation apparatus, the following problems can be caused.

- If a display apparatus and an optical system that projects a display pattern displayed by the display apparatus become large, an observation apparatus upsizes as a whole.
- As long as observation is performed by human eyes, an observer cannot resolve an observed image in a size finer than the size of photoreceptor cells. In other words, this suggest that it makes no sense to increase the resolution power (pixel density) of a display apparatus displaying a display pattern, more than necessary.

Because the display apparatus is arranged at a position conjugate with photoreceptor cells of an observer, in a case where dust/flaw or the like adheres to an optical system that projects a display pattern displayed by the display apparatus, the dust/flaw or the like is easily observed visually by the observer, and is easily recognized as a defect. Especially in a case where a display pattern is monochroic, if a so-called dead pixel is generated by the dust/flaw or the like, the dead pixel is highly visible and noticeable.

JP H08-122647 A provides no specific disclosure related to the solution of these problems.

Embodiments of the present invention are described below.

First Embodiment

Figure 1:
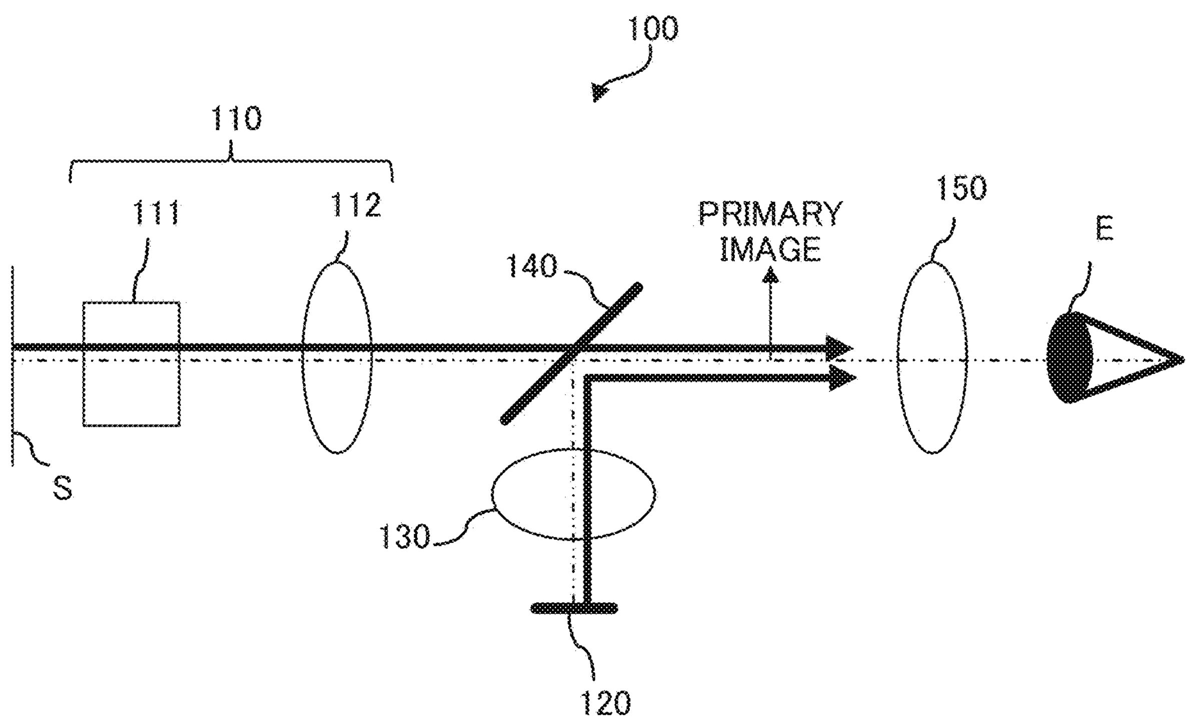
FIG. 1 is a diagram illustrating a configuration of an observation apparatus according to a first embodiment.

FIG. 1 is a diagram illustrating a configuration of an observation apparatus 100 according to the present embodiment. The observation apparatus 100 is a microscope, for example, and includes an observation optical system 110, a display apparatus 120, a display projection optical system 130, a combining optical element 140, and an eyepiece optical system 150 as illustrated in FIG. 1. Further, the observation apparatus 100 also includes a component (light source, illumination optical system, etc.) for illuminating a sample S, a personal computer (PC) for performing display control or the like of the display apparatus 120, and the like, which are not illustrated in FIG. 1.

The observation optical system 110 forms an image (primary image) of the sample S by imaging light beams from the sample S at a position conjugate with the sample S. The observation optical system 110 is a so-called infinite-distance correction optical system including an objective optical system (for example, objective lens) 111 that converts light beams from the sample S into approximately-parallel light beams, and an imaging optical system (for example, imaging lens) 112 that forms an image of the sample S by imaging the approximately-parallel light beams. Nevertheless, the observation optical system 110 is not limited to this. For example, the observation optical system 110 may be a finite-distance correction optical system, or may be an optical system including an infinite-distance correction optical system or a finite-distance correction optical system.

The display apparatus 120 is a display device that uses a liquid crystal display (LCD) or a digital mirror device (DMD), for example. The display apparatus 120 displays a display pattern (display pattern such as characters, figures, or images) indicating information (hereinafter, referred to as "auxiliary information") aiding sample observation performed by an observer, for example. The display projection optical system 130 forms an image of a display pattern displayed by the display apparatus 120, by projecting (imaging) light beams from the display apparatus 120 at a position at which the image of the sample S is formed. The combining optical element 140 combines light beams from the sample S and light beams from the display apparatus 120. The combining optical element 140 is a half mirror or a beam splitter, for example.

The eyepiece optical system 150 is an optical system that enables an observer to simultaneously observe an image of the sample S and an image of the display pattern by the observer placing an eye E at an eye point. In addition, enabling simultaneous observation of the image of the sample S and the image of the display pattern also means enabling observation of the image of the sample S and the image of the display pattern that are optically overlapped.

Further, at the position of an image on an optical path that is formed after light beams are combined by the combining optical element 140 (for example, the position of a primary image or the position of a virtual image conjugate with the primary image), the observation apparatus 100 satisfies such a condition that a numerical aperture (NA) of light beams from the display apparatus 120 is smaller than the maximum value of an NA of light beams from the sample S, and larger than the minimum value of the NA of light beams from the sample S (hereinafter, referred to as an "NA condition").

Figure 2:
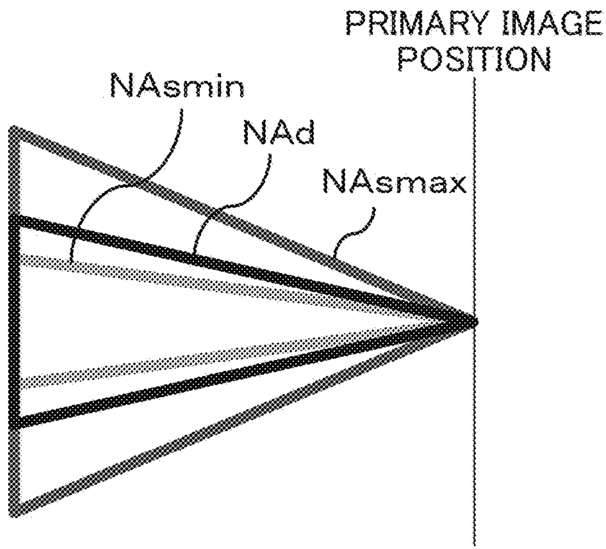
FIG. 2 is a diagram illustrating a state in which the observation apparatus satisfies an NA condition.
Figure 3:
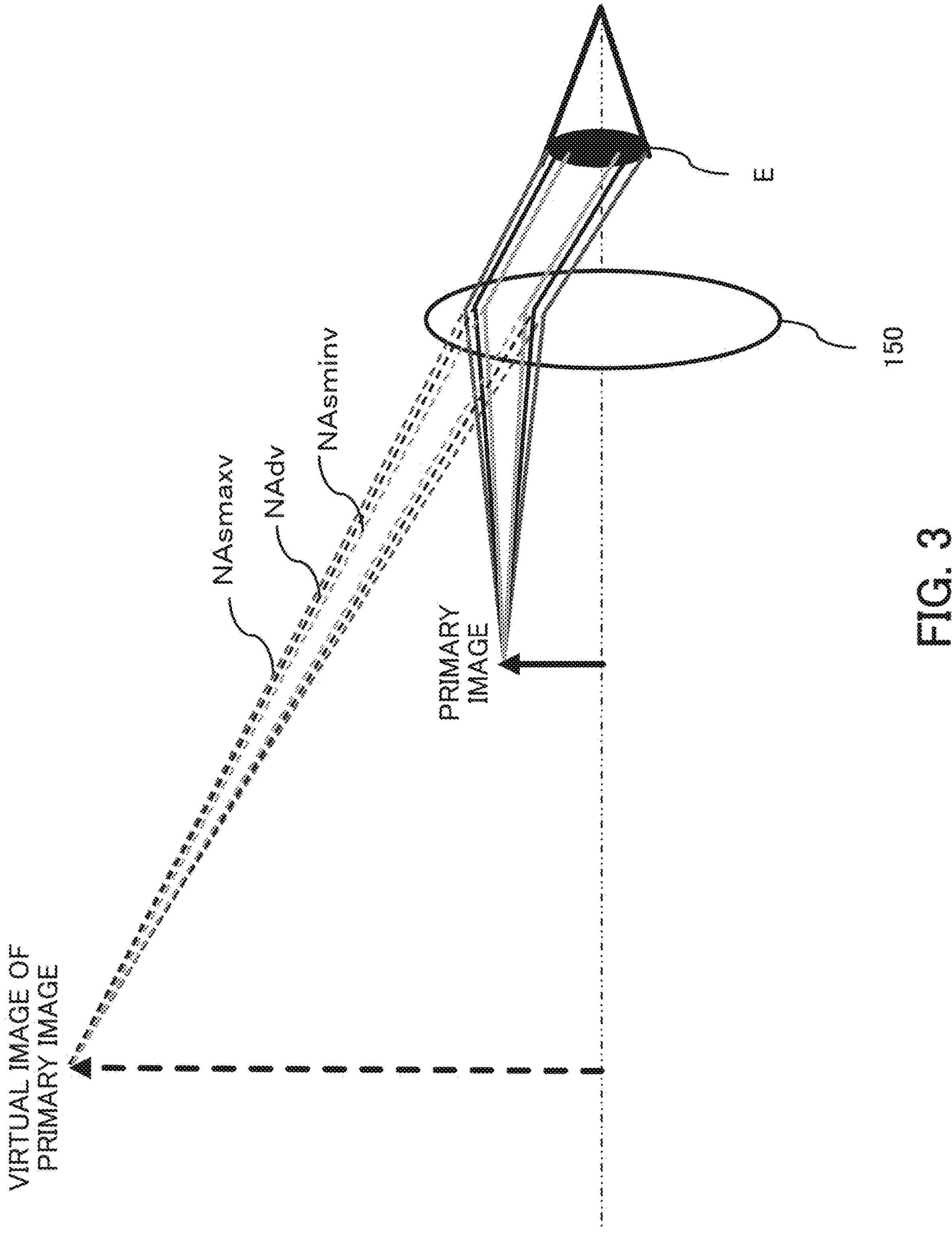
FIG. 3 is a diagram illustrating a state in which the observation apparatus satisfies an NA condition.

FIGS. 2 and 3 are diagrams each illustrating a state in which the observation apparatus 100 satisfies the NA condition. FIG. 2 illustrates a state in which the observation apparatus 100 satisfies the NA condition at the position of a primary image. Specifically, FIG. 2 illustrates a state in which $NAsmin<NAd<NAsmax$ is satisfied (i.e., the NA condition is satisfied), where an NA of light beams from the display apparatus 120 is denoted by NAd, the maximum value of an NA of light beams from the sample S is denoted by NAsmax, and the minimum value of an NA of light beams from the sample S is denoted by NAsmin.

FIG. 3 illustrates a state in which the observation apparatus 100 satisfies the NA condition at the position of a virtual image conjugate with the primary image (image conjugate with the primary image that is formed by the eyepiece optical system 150). Specifically, FIG. 3 illustrates a state in which $NAsminv<NAdv<NAsmaxv$ is satisfied (i.e., the NA condition is satisfied), where, among light beams obtained by extending light beams entering the eye E of an observer, assuming that the eyepiece optical system 150 does not exist, a value equivalent to an NA of light beams from the display apparatus 120 is denoted by NAdv, a value equivalent to the maximum value of an NA of light beams from the sample S is denoted by NAsmaxv, and a value equivalent to the minimum value of an NA of light beams from the sample S is denoted by NAsminv.

In addition, the observation optical system 110 (more specifically, the objective optical system 111) includes a plurality of objective lenses having different magnifications or NAs, and is configured to be able to select (switch) an objective lens to be inserted onto the optical path, from among the plurality of objective lenses. Thus, in the observation apparatus 100, depending on the magnification or the NA of the selected objective lens, an NA of light beams from the sample S in the NA condition changes. Accordingly, the maximum value and the minimum value of the NA of light beams from the sample S in the NA condition are determined based on an objective lens that can be included in the observation optical system 110, for example.

By the observation apparatus 100 satisfying the NA condition, the following effects are obtained.

In the NA condition, by satisfying such a condition that an NA of light beams from the display apparatus 120 is smaller than the maximum value of an NA of light beams from the sample S (hereinafter, referred to as an "NA condition 1"), the NA of light beams from the display apparatus 120 can be made smaller than the maximum value of the NA of light beams from the sample S. Thus, there is no need to increase the resolution power (pixel density) of the display apparatus 120 more than necessary, and it is possible to employ the display apparatus 120 with appropriate resolution power in accordance with the size of photoreceptor cells. Further, by satisfying the NA condition 1, the NA of light beams from the display apparatus 120 becomes smaller. Consequently, a compact display apparatus 120 can be employed with a higher projection magnification of the display pattern displayed by the display apparatus 120 and the display projection optical system 130 can also be downsized. Accordingly, the observation apparatus 100 can be realized with a compact configuration.

In the NA condition, by satisfying such a condition that an NA of light beams from the display apparatus 120 is larger than the minimum value of an NA of light beams from the sample S (hereinafter, referred to as an "NA condition 2"), an observer can be made less likely to observe dust/flaw or the like that can adhere to the display projection optical system 130, via the eyepiece optical system 150. If the NA condition 2 is unsatisfied, an incident NA of the display projection optical system 130 becomes smaller, and overlap of light rays at each image height of the display pattern decreases. Thus, dust/flaw or the like that can adhere to the display projection optical system 130 is easily observed via the eyepiece optical system 150.

Further, the observation apparatus 100 satisfies the following conditional expression (1) where a distance from the display apparatus 120 to an optical member of the display projection optical system 130 that is closest to the display apparatus 120 is denoted by WD, an NA of light beams taken in by the display projection optical system 130 from the display apparatus 120 (an incident NA of the display projection optical system 130) is denoted by a, and a circumradius of a display region of the display apparatus 120 is denoted by R:

$$WD \times \alpha > R/10. \tag{1}$$

By the observation apparatus 100 satisfying Conditional Expression (1), an observer can be made further less likely to observe dust/flaw or the like that can adhere to the display projection optical system 130.

Figure 4:
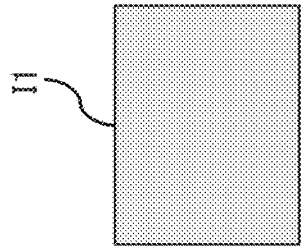
FIG. 4 is a diagram illustrating an example of a case where Conditional Expression (1) is satisfied and a case where Conditional Expression (1) is unsatisfied.
Figure 4:
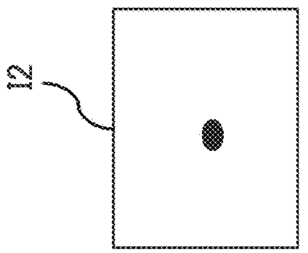
Figure 4:
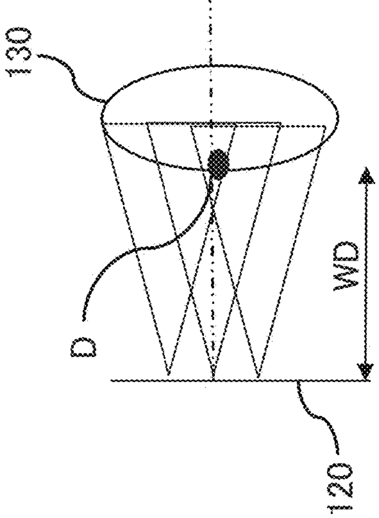
Figure 4:
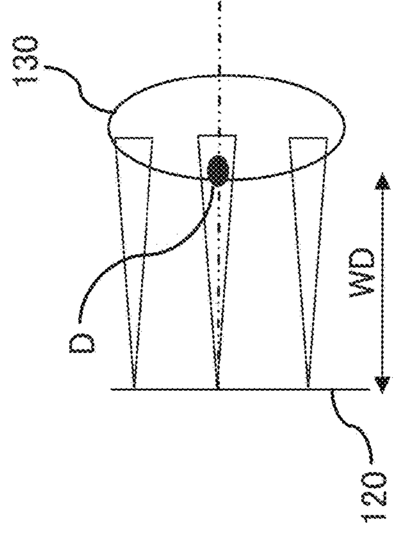

FIG. 4 is a diagram illustrating an example of a case where Conditional Expression (1) is satisfied and a case where Conditional Expression (1) is unsatisfied. In a case where Conditional Expression (1) is satisfied, as illustrated on the upper left side of FIG. 4, many of light beams from the display apparatus 120 overlap with dust/flaw D adhering to the display projection optical system 130. Thus, as a result, as illustrated on the upper right side of FIG. 4, an image I1 formed by the display projection optical system 130 just becomes a bit dark as a whole, and becomes less likely to be observed by an observer as the dust/flaw D. In contrast to this, in a case where Conditional Expression (1) is unsatisfied, as illustrated on the lower left side of FIG. 4, only a part of light beams from the display apparatus 120 overlaps with the dust/flaw D adhering to the display projection optical system 130. Thus, as a result, as illustrated on the lower right side of FIG. 4, the dust/flaw D is projected as a point in an image I2 formed by the display projection optical system 130, and becomes more likely to be observed by an observer as the dust/flaw D.

Second Embodiment

Figure 5:
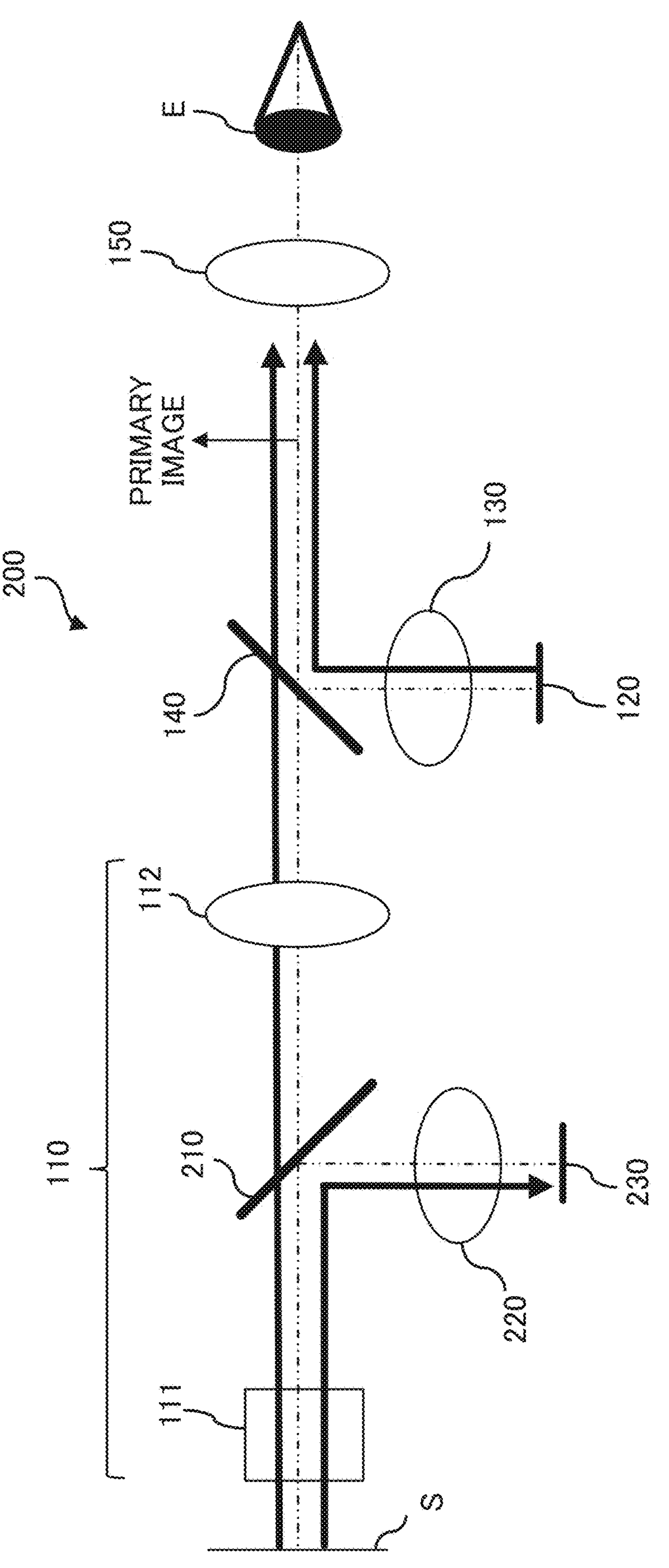
FIG. 5 is a diagram illustrating a configuration of an observation apparatus according to a second embodiment.

FIG. 5 is a diagram illustrating a configuration of an observation apparatus 200 according to the present embodiment. As illustrated in FIG. 5, the observation apparatus 200 is an observation apparatus further including a splitting optical element 210, an image capturing optical system 220, and an image sensor 230 connected to a PC, in addition to the components included in the observation apparatus 100 according to the first embodiment (refer to FIG. 1).

The splitting optical element 210 is arranged on an optical path between the sample S and the combining optical element 140. More specifically, the splitting optical element 210 is arranged on an optical path between the objective optical system 111 and the imaging optical system 112. The splitting optical element 210 splits light beams from the sample S into light beams going toward the direction of the combining optical element 140 and light beams going toward the direction of the image sensor 230, and guides at least a part of light beams from the sample S to the image sensor 230. The splitting optical element 210 is a half mirror or a beam splitter, for example. The image capturing optical system 220 images light beams from the sample S that have been split by the splitting optical element 210, onto the image sensor 230. The image sensor 230 is a charge-coupled device (CCD) sensor, for example, and captures an image of the sample S that has been imaged by the image capturing optical system 220.

An image captured by the image sensor 230 only includes an image of the sample S, and does not include an image of a display pattern displayed by the display apparatus 120. Accordingly, it becomes possible to capture an image of the sample S and store the image as-is as an image of the sample S, and perform various types of analysis based on the image. In addition, the storing and analysis are performed by the PC, for example. Further, by the PC performing control of displaying information that is based on the image of the sample S or an analysis result, on the display apparatus 120 as auxiliary information, an observer can simultaneously observe an image of a display pattern indicating the auxiliary information, and the image of the sample S.

Further, the observation apparatus 200 satisfies the following conditional expression (2) where an imaging range on the sample S that is generated by the image sensor 230 is denoted by Dc, and an observation range on the sample S that is generated by the observation optical system 110 is denoted by Do:

$$0.5 < Dc/Do < 2.0. \tag{2}$$

Figure 6:
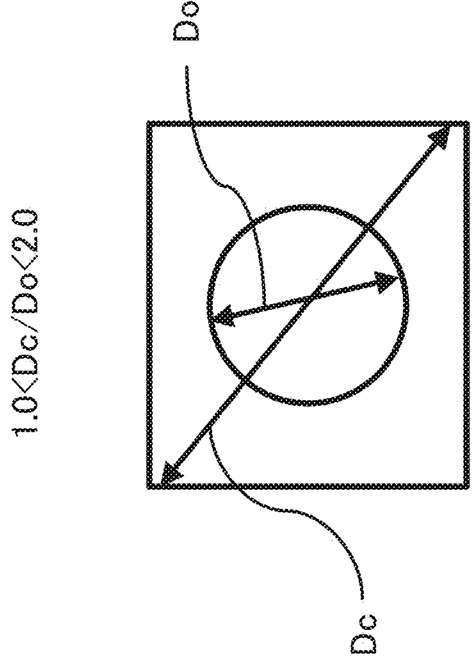
FIG. 6 is a diagram illustrating a relationship between an imaging range Dc and an observation range Do that are obtainable when Conditional Expression (2) is satisfied.
Figure 6:
Figure 6:
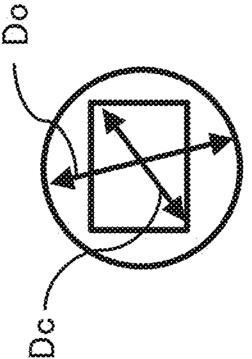

FIG. 6 is a diagram illustrating a relationship between an imaging range Dc and an observation range Do that are obtainable when Conditional Expression (2) is satisfied. The left side of FIG. 6 illustrates a case where $0.5<Dc/Do<1.0$ is satisfied. In this case, the imaging range Dc becomes smaller than the observation range Do. The right side of FIG. 6 illustrates a case where $1.0<Dc/Do<2.0$ is satisfied. In this case, the imaging range Dc becomes larger than the observation range Do. In addition, the imaging range Dc denotes a diagonal line length of a rectangle indicating the imaging range, and the observation range Do denotes a diameter of a circle indicating the observation range.

Further, the observation apparatus 200 satisfies the following conditional expression (3) where a size of each pixel of the display apparatus 120 is denoted by Ppro, a size of each pixel of the image sensor 230 is denoted by Pc, projection magnification from the sample S to the image sensor 230 is denoted by MGc, projection magnification from the display apparatus 120 to a primary image position is denoted by MGpro, and projection magnification from the sample S to the primary image position is denoted by Mgo:

$$Ppro \times MGpro > Pc \times MGo/MGc. \quad (3)$$

Conditional Expression (3) also serves as a conditional expression defining that, in a case where pixels are compared at the primary image position, the pixel of the display apparatus 120 is larger than the pixel of the image sensor 230 (the pixel of the image sensor 230 is smaller than the pixel of the display apparatus 120). Accordingly, in a case where Conditional Expression (3) is satisfied, for example, the PC can perform binning processing of an image captured by the image sensor 230. Further, by the PC performing control of displaying binning-processed image on the display apparatus 120, an observer can simultaneously observe the image of the sample S and an image of a display pattern indicating the binning-processed image.

The observation apparatus 200 having such a configuration also satisfies at least the NA condition, and can obtain the above-described effects caused by the satisfaction.

Third Embodiment

Figure 7:
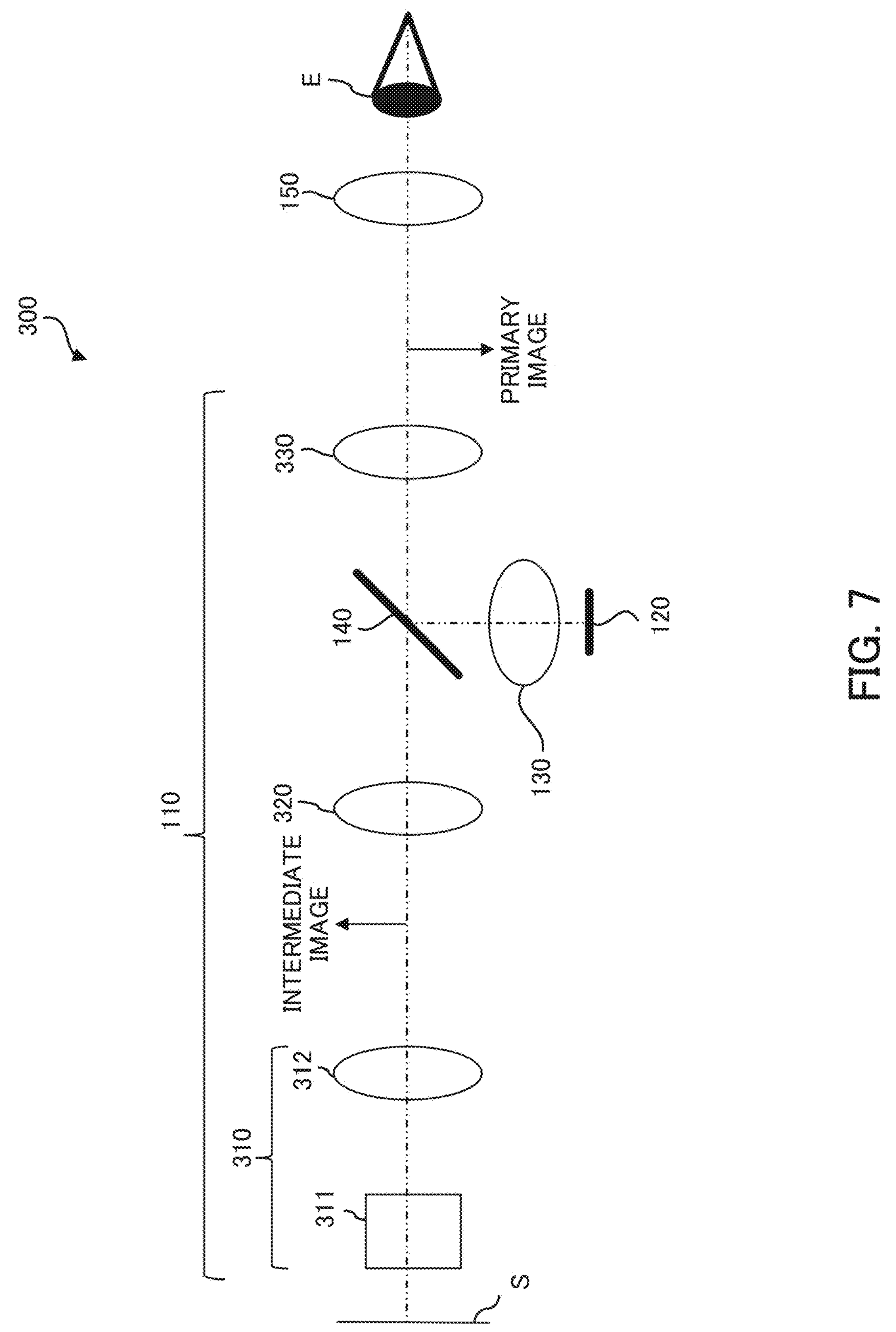
FIG. 7 is a diagram illustrating a configuration of an observation apparatus according to a third embodiment.

FIG. 7 is a diagram illustrating a configuration of an observation apparatus 300 according to the present embodiment. As illustrated in FIG. 7, the observation apparatus 300 differs from the observation apparatus 100 according to the first embodiment (refer to FIG. 1) in the configuration of an observation optical system 110 and an arrangement position of a combining optical element 140.

More specifically, the observation optical system 110 includes a primary imaging optical system 310, a first field lens 320, and a second field lens 330. The primary imaging optical system 310 forms an intermediate image conjugate with a primary image formed by the observation optical system 110. The primary imaging optical system 310 is a so-called infinite-distance correction optical system including an objective optical system (for example, objective lens) 311 that converts light beams from the sample S into approximately-parallel light beams, and an imaging optical system (for example, imaging lens) 312 that forms an intermediate image by imaging the approximately-parallel light beams. Nevertheless, the primary imaging optical system 310 is not limited to this, and may be a finite-distance correction optical system, for example. In addition, the objective optical system 311 and the imaging optical system 312 also serve as the objective optical system 111 and the imaging optical system 112 in the observation apparatus 100.

The first field lens 320 converts light beams from the intermediate image into approximately-parallel light beams. The second field lens 330 forms a primary image by imaging the approximately-parallel light beams. The combining optical element 140 is arranged on an optical path between the first field lens 320 and the second field lens 330. In accordance with the arrangement, the display projection optical system 130 converts light beams from the display apparatus 120 into approximately-parallel light beams. Further, the focal length of the display projection optical system 130 is shorter than the focal length of the second field lens 330. In other words, projection from the display apparatus 120 to the primary image position is regarded as an enlargement system.

The observation apparatus 300 having such a configuration also satisfies at least the NA condition, and can obtain the above-described effects caused by the satisfaction.

Fourth Embodiment

Figure 8:
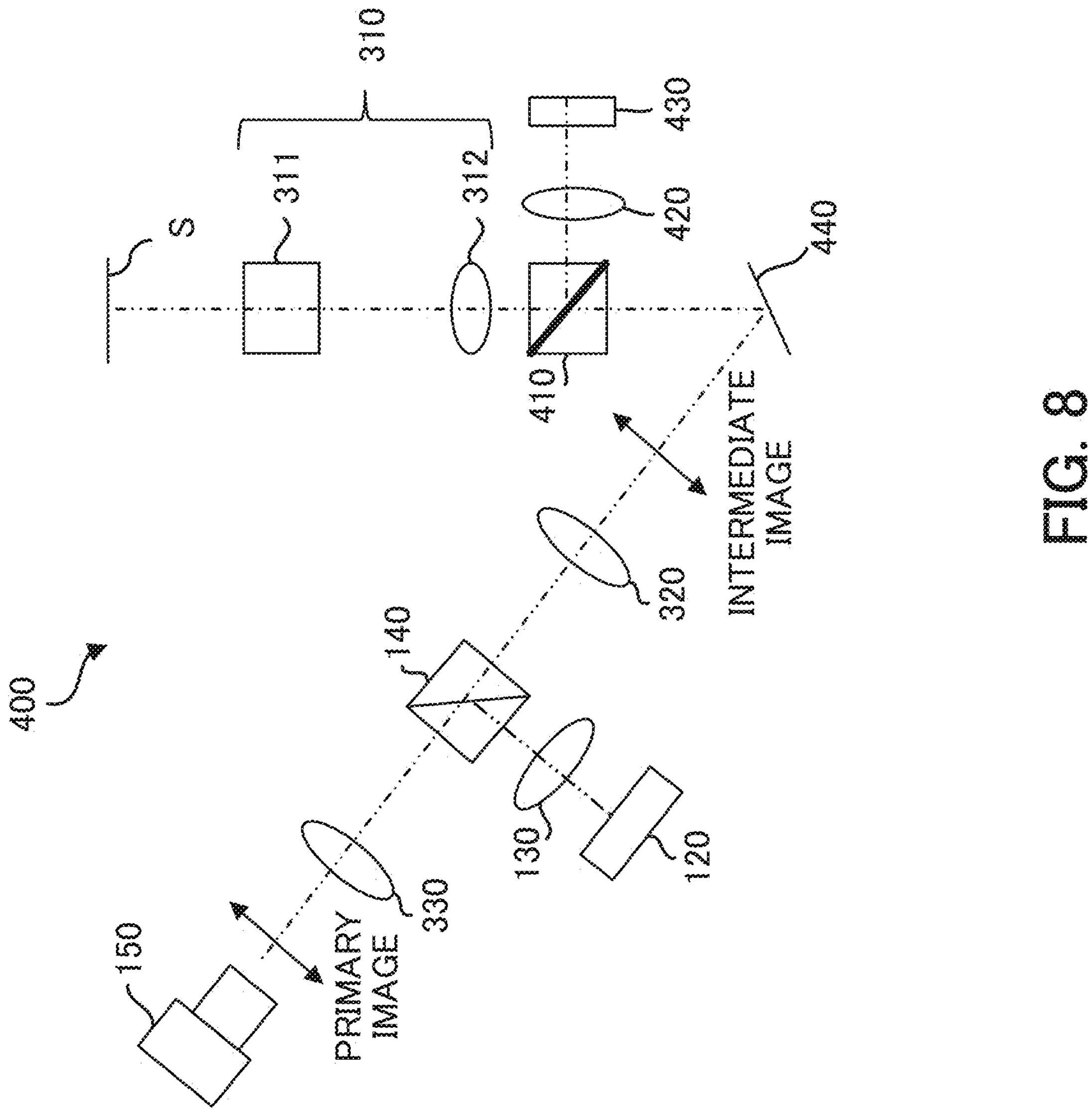
FIG. 8 is a diagram illustrating a configuration of an observation apparatus according to a fourth embodiment.

FIG. 8 is a diagram illustrating a configuration of an observation apparatus 400 according to the present embodiment. As illustrated in FIG. 8, the observation apparatus 400 is obtained by forming the observation apparatus 300 according to the third embodiment (refer to FIG. 7) as an inverted microscope, and further including a component for capturing an image of the sample S, in addition to the components included in the observation apparatus 300. More specifically, the observation apparatus 400 further includes a splitting optical element 410, an image capturing optical system 420, an image sensor 430 connected to a PC, and a reflection mirror 440 in addition to the components included in the observation apparatus 300.

The splitting optical element 410 is arranged on an optical path between the sample S and the combining optical element 140. More specifically, the splitting optical element 410 is arranged on an optical path between the primary imaging optical system 310 and the reflection mirror 440. The splitting optical element 410 splits light beams from the sample S into light beams going toward the direction of the reflection mirror 440 and light beams going toward the direction of the image sensor 430, and guides at least a part of light beams from the sample S to the image sensor 430. The splitting optical element 410 is a half mirror or a beam splitter, for example. The image capturing optical system 420 images light beams from the sample S that have been split by the splitting optical element 410, onto the image sensor 430. The image sensor 430 is a CCD sensor, for example, and captures an image of the sample S that has been imaged by the image capturing optical system 420. The reflection mirror 440 reflects light beams from the sample S that have been split by the splitting optical element 410. Light beams from the sample S that have been reflected by the reflection mirror 440 are subsequently imaged, and form an intermediate image.

In the observation apparatus 400, for example, by the PC performing control of displaying information that is based on the image of the sample S that has been captured by the image sensor 430 or an analysis result thereof, on the display apparatus 120 as auxiliary information, an observer can simultaneously observe an image of a display pattern indicating the auxiliary information, and the image of the sample S. The observation apparatus 400 having such a configuration also satisfies at least the NA condition, and can obtain the above-described effects caused by the satisfaction.

Fifth Embodiment

Figure 9:
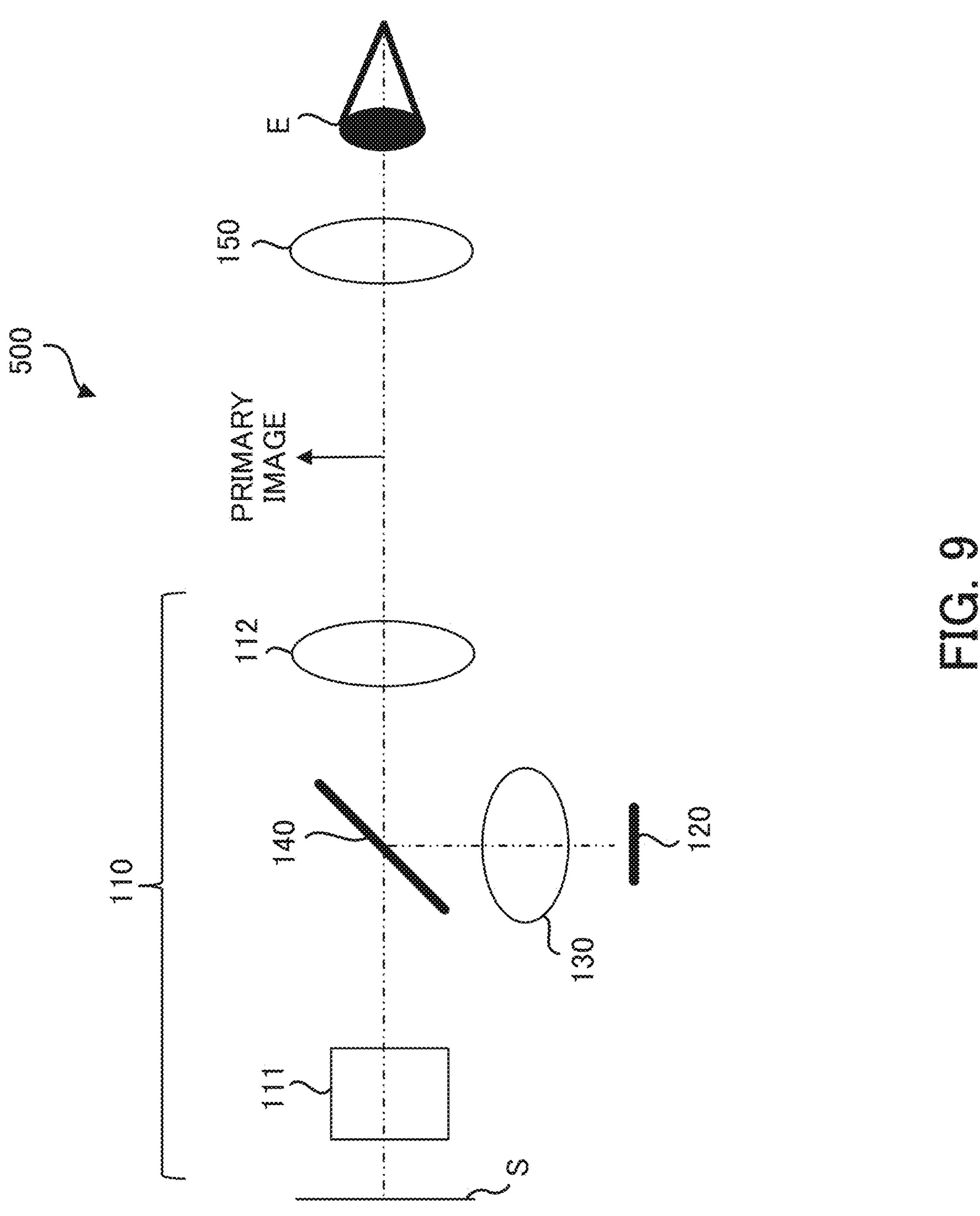
FIG. 9 is a diagram illustrating a configuration of an observation apparatus according to a fifth embodiment.

FIG. 9 is a diagram illustrating a configuration of an observation apparatus 500 according to the present embodiment. As illustrated in FIG. 9, the observation apparatus 500 differs from the observation apparatus 100 according to the first embodiment (refer to FIG. 1) in an arrangement position of a combining optical element 140.

More specifically, in the observation apparatus 500, the combining optical element 140 is arranged on an optical path between the objective optical system 111 and the imaging optical system 112. Further, in accordance with the arrangement, the display projection optical system 130 converts light beams from the display apparatus 120 into approximately-parallel light beams, and the focal length of the display projection optical system 130 is shorter than the focal length of imaging optical system 112. In other words, projection from the display apparatus 120 to the primary image position is regarded as an enlargement system.

The observation apparatus 500 having such a configuration also satisfies at least the NA condition, and can obtain the above-described effects caused by the satisfaction.

Sixth Embodiment

Figure 10:
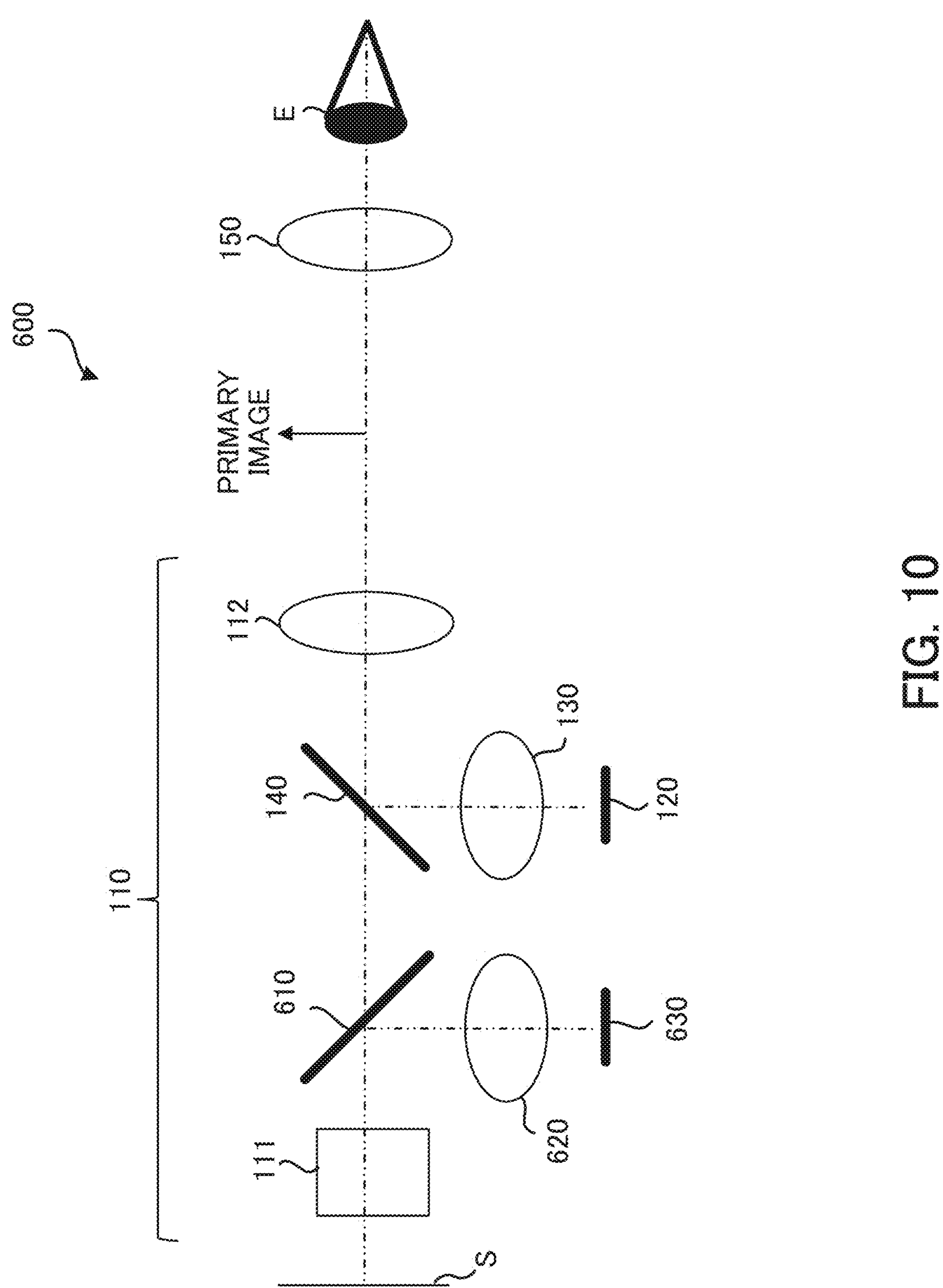
FIG. 10 is a diagram illustrating a configuration of an observation apparatus according to a sixth embodiment.

FIG. 10 is a diagram illustrating a configuration of an observation apparatus 600 according to the present embodiment. As illustrated in FIG. 10, the observation apparatus 600 is an observation apparatus further including a splitting optical element 610, an image capturing optical system 620, and an image sensor 630 connected to a PC, in addition to the components included in the observation apparatus 500 according to the fifth embodiment (refer to FIG. 9).

The splitting optical element 610 is arranged on an optical path between the sample S and the combining optical element 140. More specifically, the splitting optical element 610 is arranged on an optical path between the objective optical system 111 and the combining optical element 140. The splitting optical element 610 splits light beams from the sample S into light beams going toward the direction of the combining optical element 140 and light beams going toward the direction of the image sensor 630, and guides at least a part of light beams from the sample S to the image sensor 630. The splitting optical element 610 is a half mirror or a beam splitter, for example. The image capturing optical system 620 images light beams from the sample S that have been split by the splitting optical element 610, onto the image sensor 630. The image sensor 630 is a CCD sensor, for example, and captures an image of the sample S that has been imaged by the image capturing optical system 620.

In the observation apparatus 600, for example, by the PC performing control of displaying information that is based on the image of the sample S that has been captured by the image sensor 630 or an analysis result thereof, on the display apparatus 120 as auxiliary information, an observer can simultaneously observe an image of a display pattern indicating the auxiliary information, and the image of the sample S. The observation apparatus 600 having such a configuration also satisfies at least the NA condition, and can obtain the above-described effects caused by the satisfaction.

Seventh Embodiment

Figure 11:
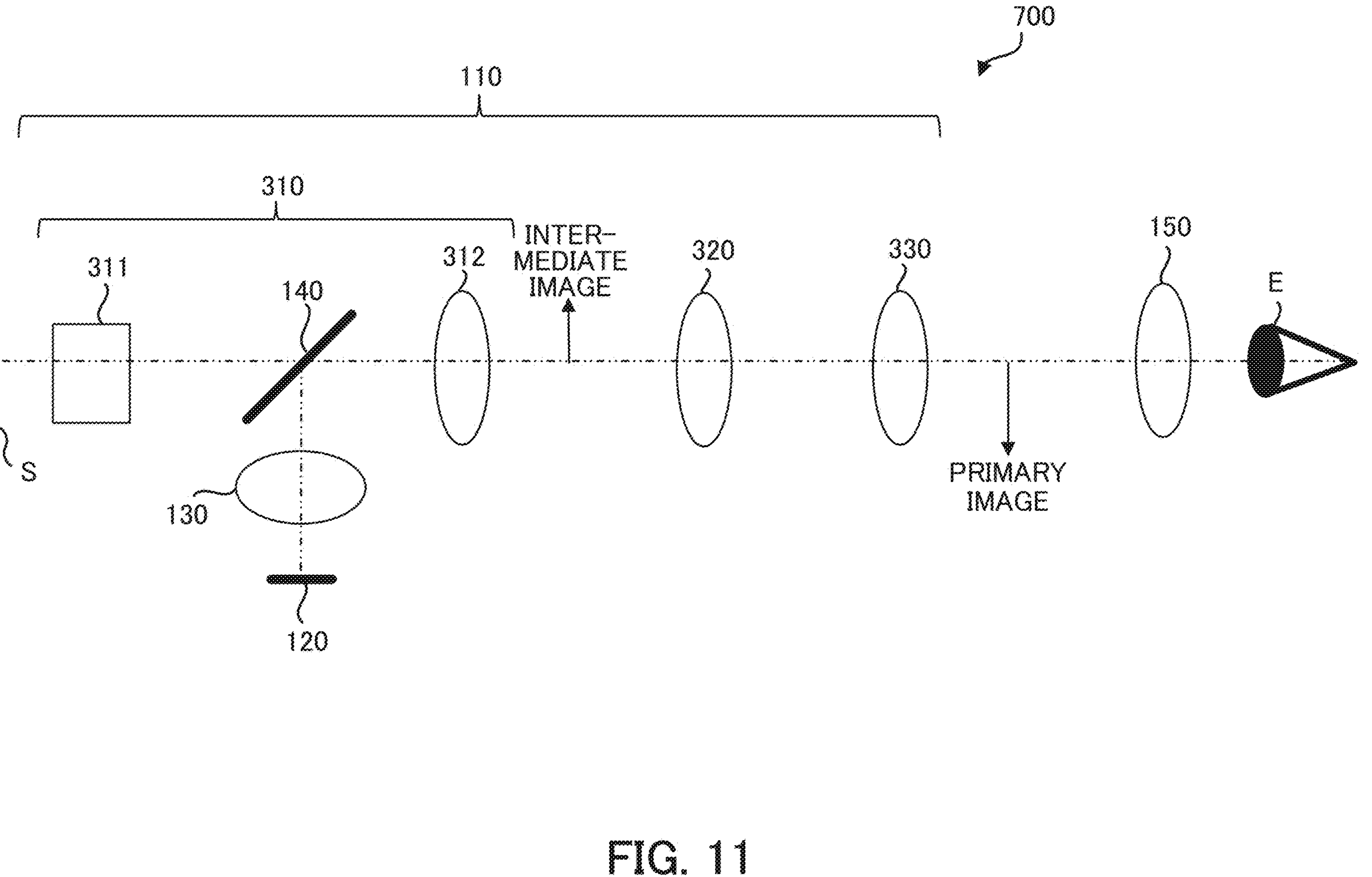
FIG. 11 is a diagram illustrating a configuration of an observation apparatus according to a seventh embodiment.

FIG. 11 is a diagram illustrating a configuration of an observation apparatus 700 according to the present embodiment. As illustrated in FIG. 11, the observation apparatus 700 differs from the observation apparatus 300 according to the third embodiment (refer to FIG. 7) in an arrangement position of a combining optical element 140.

More specifically, in the observation apparatus 700, the combining optical element 140 is arranged on an optical path between the objective optical system 311 and the imaging optical system 312. Further, in accordance with the arrangement, the display projection optical system 130 converts light beams from the display apparatus 120 into approximately-parallel light beams, and the focal length of the display projection optical system 130 is shorter than the focal length of imaging optical system 112. In other words, projection from the display apparatus 120 to an intermediate image position is regarded as an enlargement system.

The observation apparatus 700 having such a configuration also satisfies at least the NA condition, and can obtain the above-described effects caused by the satisfaction. In addition, also in the observation apparatus 700, similarly to the observation apparatus 600 according to the sixth embodiment (refer to FIG. 10), a splitting optical element, an image capturing optical system, and an image sensor connected to a PC may be further included.

Eighth Embodiment

An observation apparatus according to the present embodiment further includes a binocular tube in addition to the components included in an observation apparatus according to any one of the first to seventh embodiments. The binocular tube is arranged closer to an observer than the combining optical element 140, and splits light beam into light beam going toward both eyes of the observer. The binocular tube serves as an example of an eye separation optical system. Further, in accordance with the binocular tube being included, the observation apparatus according to the present embodiment includes two eyepiece optical systems 150. The observation apparatus having such a configuration also satisfies at least the NA condition, and can obtain the above-described effects caused by the satisfaction.

Ninth Embodiment

Figure 12:
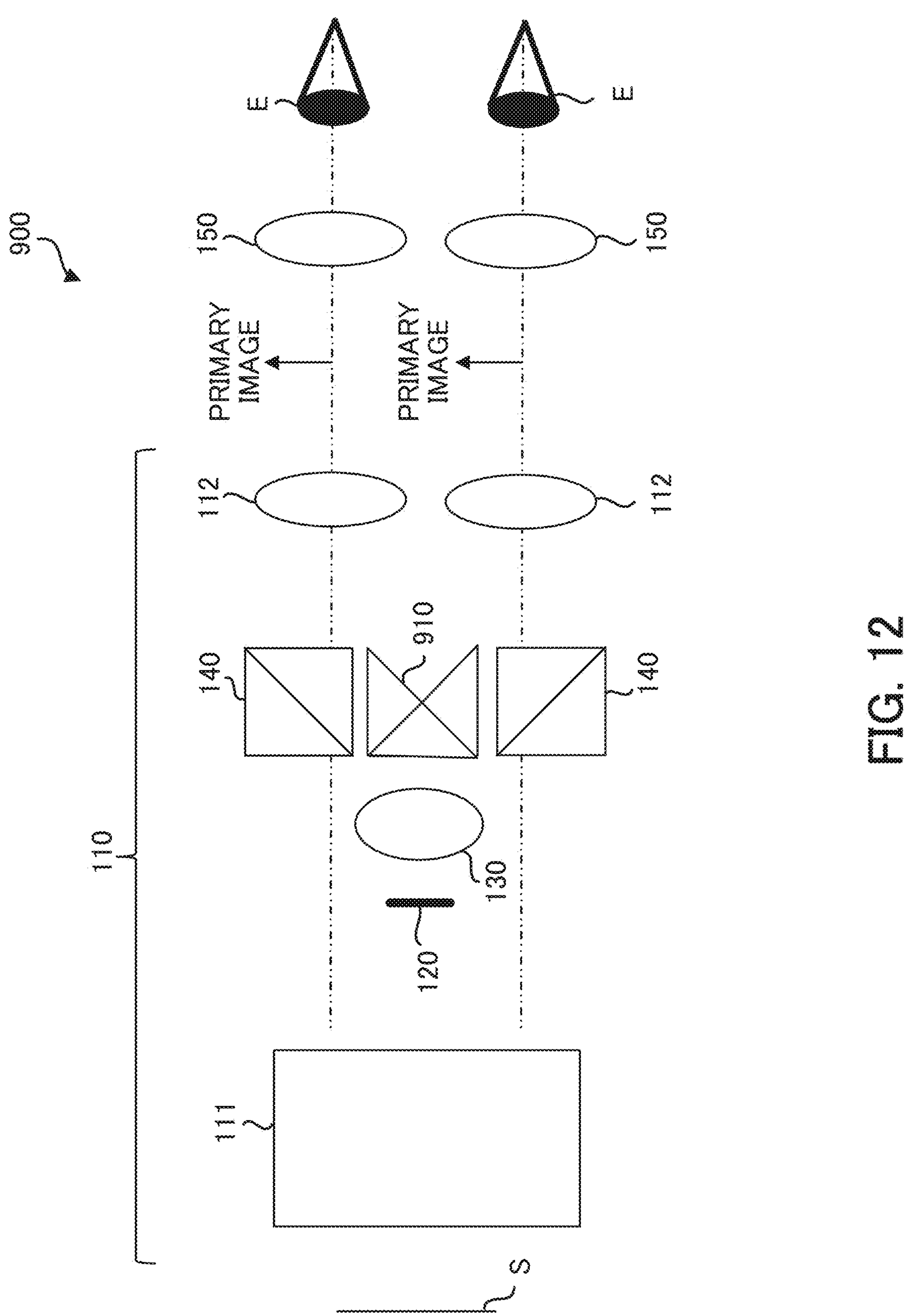
FIG. 12 is a diagram illustrating a configuration of an observation apparatus according to a ninth embodiment.

FIG. 12 is a diagram illustrating a configuration of an observation apparatus 900 according to the present embodiment. As illustrated in FIG. 12, the observation apparatus 900 further includes a display splitting optical element 910, and also includes two combining optical elements 140, two imaging optical systems 112, and two eyepiece optical systems 150 in such a manner as to enable an observer to perform observation with both eyes, in the observation apparatus 500 according to the fifth embodiment (refer to FIG. 9). The display splitting optical element 910 is arranged closer to the display apparatus 120 than each of the combining optical elements 140, and splits light beams from the display apparatus 120 into light beams going toward the direction of one combining optical element 140 and light beams going toward the direction of the other combining optical element 140. The observation apparatus 900 having such a configuration also satisfies at least the NA condition, and can obtain the above-described effects caused by the satisfaction.

Tenth Embodiment

Figure 13:
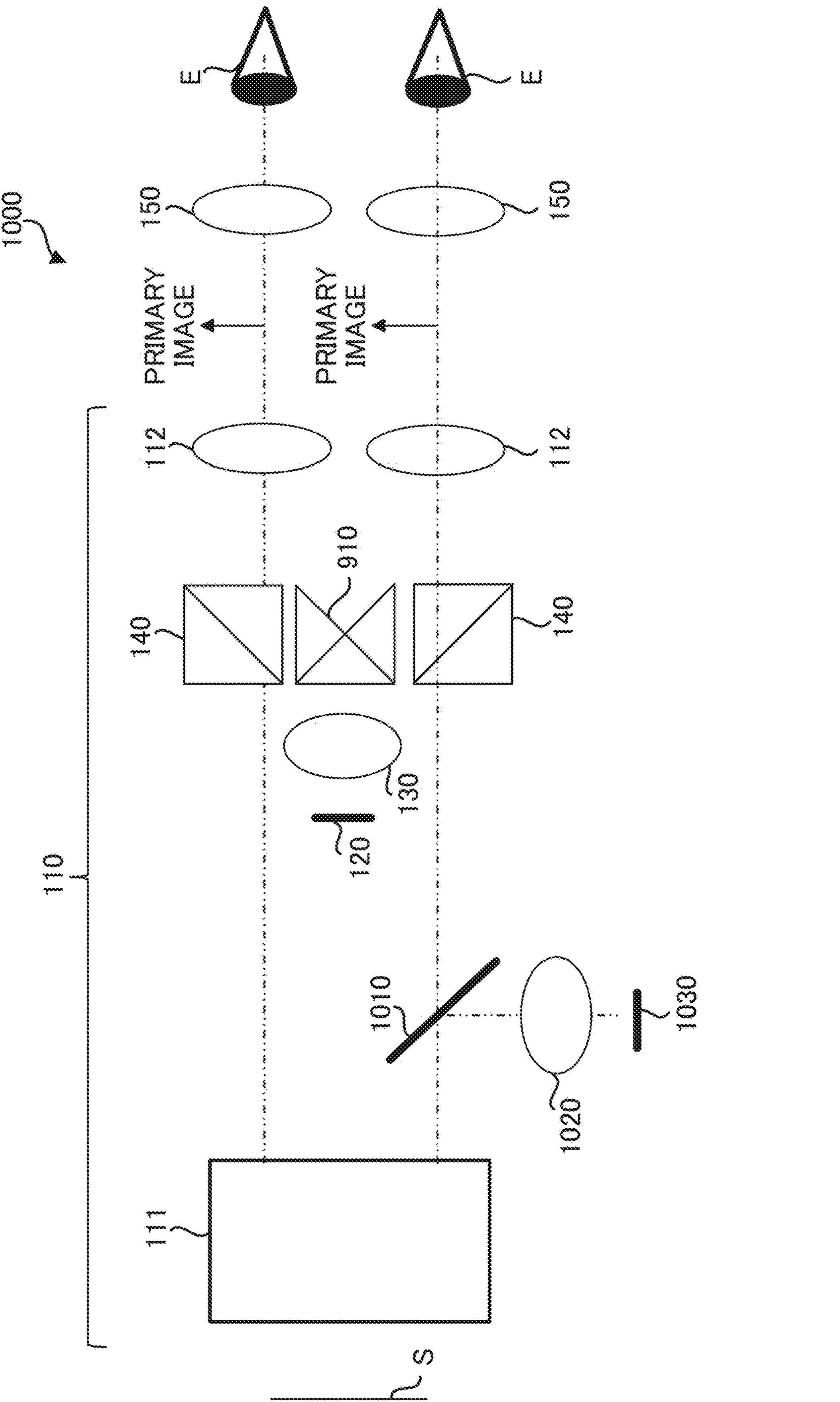
FIG. 13 is a diagram illustrating a configuration of an observation apparatus according to a tenth embodiment.

FIG. 13 is a diagram illustrating a configuration of an observation apparatus 1000 according to the present embodiment. As illustrated in FIG. 13, the observation apparatus 1000 is an observation apparatus further including a splitting optical element 1010, an image capturing optical system 1020, and an image sensor 1030 connected to a PC, in addition to the components included in the observation apparatus 900 according to the ninth embodiment (refer to FIG. 12).

The splitting optical element 1010 is arranged on an optical path between the sample S and one combining optical element 140. More specifically, the splitting optical element 1010 is arranged on an optical path between the objective optical system 111 and one combining optical element 140. The splitting optical element 1010 splits light beams from the sample S into light beams going toward the direction of one combining optical element 140 and light beams going toward the direction of the image sensor 1030, and guides at least a part of light beams from the sample S to the image sensor 1030. The splitting optical element 1010 is a half mirror or a beam splitter, for example. The image capturing optical system 1020 images light beams from the sample S that have been split by the splitting optical element 1010, onto the image sensor 1030. The image sensor 1030 is a CCD sensor, for example, and captures an image of the sample S that has been imaged by the image capturing optical system 1020.

In the observation apparatus 1000, for example, by the PC performing control of displaying information that is based on the image of the sample S that has been captured by the image sensor 1030 or an analysis result thereof, on the display apparatus 120 as auxiliary information, an observer can simultaneously observe an image of a display pattern indicating the auxiliary information, and the image of the sample S with both eyes. The observation apparatus 1000 having such a configuration also satisfies at least the NA condition, and can obtain the above-described effects caused by the satisfaction.

Eleventh Embodiment

An observation apparatus according to the present embodiment further includes a binocular tube arranged closer to the observation optical system 110 than the eyepiece optical system 150, in addition to the components included in an observation apparatus according to any one of the first to seventh embodiments, and uses a part of the binocular tube as a combining optical element that combines light beams from the sample S and light beams from the display apparatus 120. Further, in accordance with this configuration, the display apparatus 120 and the display projection optical system 130 are included in the binocular tube. In addition, a part of the binocular tube is an example of a turn-back optical system that splits light beams into light beams going towards both eyes of an observer, and makes an eye width adjustable. The binocular tube includes a plurality of prisms, for example, and a part the prisms is used as a combining optical element. Further, the observation apparatus according to the present embodiment includes two eyepiece optical systems 150 in accordance with the binocular tube being included.

Figure 14:
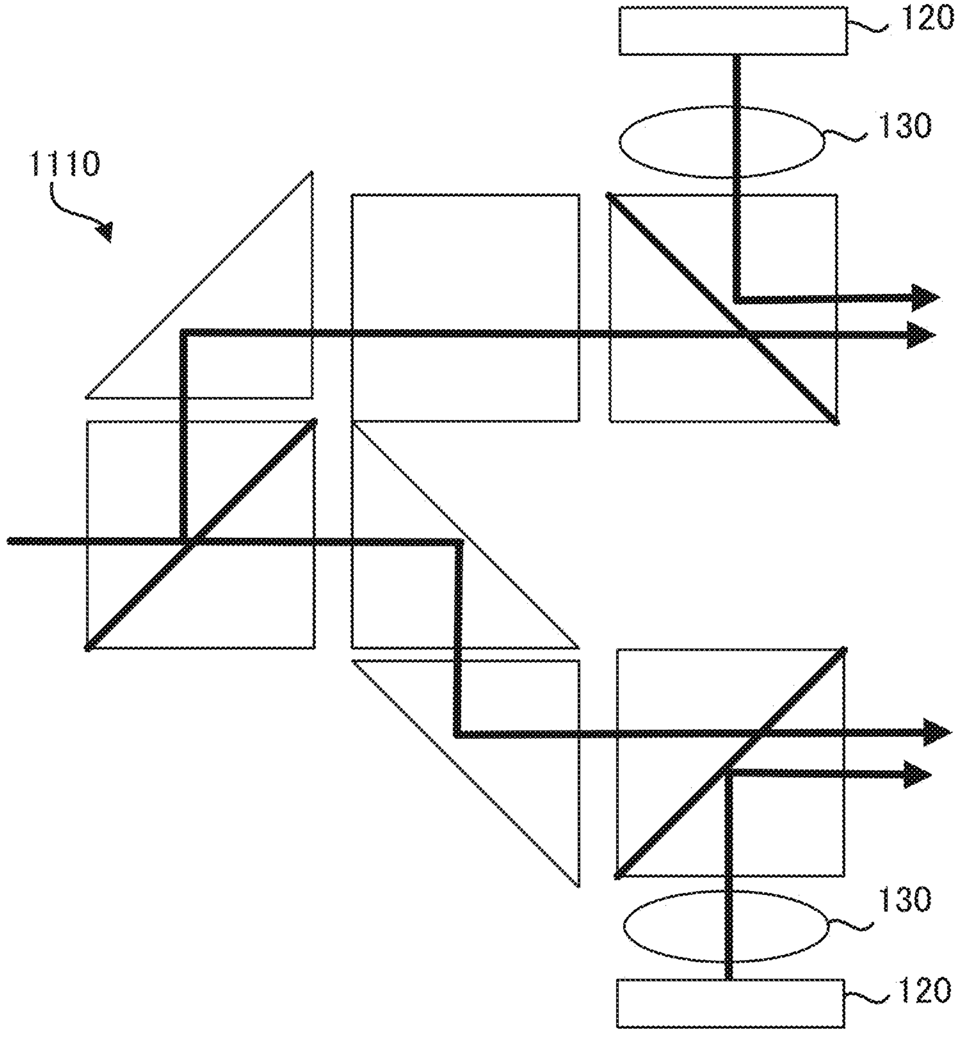
FIG. 14 is a diagram illustrating a configuration of a binocular tube of an observation apparatus according to an eleventh embodiment.

FIG. 14 is a diagram illustrating a configuration of a binocular tube of an observation apparatus according to the present embodiment. The binocular tube illustrated in FIG. 14 includes a plurality of prisms 1110, two display apparatuses 120, and two display projection optical systems 130. Then, a part of the plurality of prisms 1110 is used as a combining optical element that combines light beams going toward one eye of the observer, and light beams from one display apparatus 120, and another part of the plurality of prisms 1110 is used as a combining optical element that combines light beams going toward the other eye of the observer, and light beams from the other display apparatus 120. The observer can thereby simultaneously observe an image of the sample S and an image of a display pattern with both eyes. In such a configuration, because the binocular tube can be realized without changing a lens barrel length even if the binocular tube includes two display apparatuses 120 and two display projection optical systems 130, a device configuration can be made compact.

Figure 15:
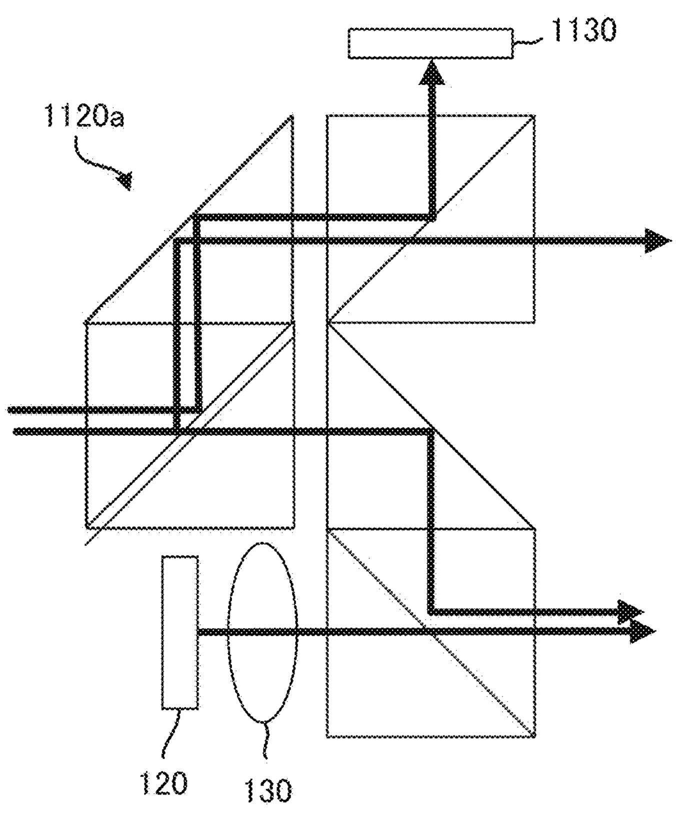
FIG. 15 is a diagram illustrating another configuration of a binocular tube of an observation apparatus according to the eleventh embodiment.
Figure 16:
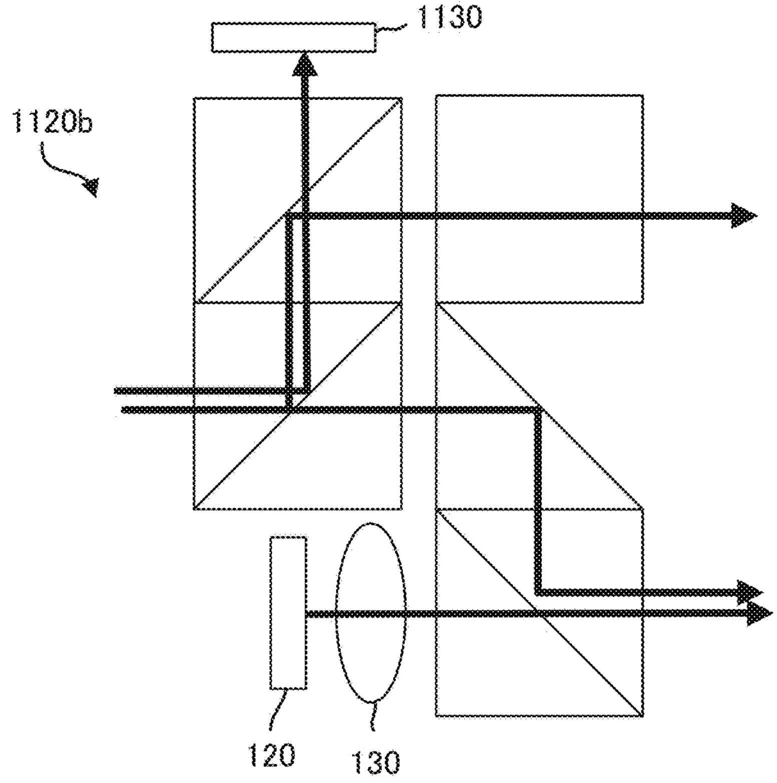
FIG. 16 is a diagram illustrating another configuration of a binocular tube of an observation apparatus according to the eleventh embodiment.

FIGS. 15 and 16 are diagrams each illustrating another configuration of a binocular tube of an observation apparatus according to the present embodiment. The binocular tubes illustrated in FIGS. 15 and 16 each include a plurality of prisms 1120 (1120*a* or 1120*b*), the display apparatus 120, the display projection optical system 130, and a camera (including an image capturing optical system and an image sensor) 1130 connected to a PC. Then, a part of the plurality of prisms 1120 is used as a combining optical element that combines light beams going toward one eye of the observer, and light beams from the display apparatus 120, and another part of the plurality of prisms 1120 is used as an element (can also be said as a splitting optical element) for guiding at least a part of light beams from the sample S to the camera 1130.

In the observation apparatus according to the present embodiment, for example, by the PC performing control of displaying information that is based on the image of the sample S that has been captured by the camera 1130 or an analysis result thereof, on the display apparatus 120 as auxiliary information, an observer can simultaneously observe an image of a display pattern and the image of the sample S, although the image of the display pattern indicating the auxiliary information can only be observed with one eye. The observation apparatus having such a configuration also satisfies at least the NA condition, and can obtain the above-described effects caused by the satisfaction.

Twelfth Embodiment

Figure 17:
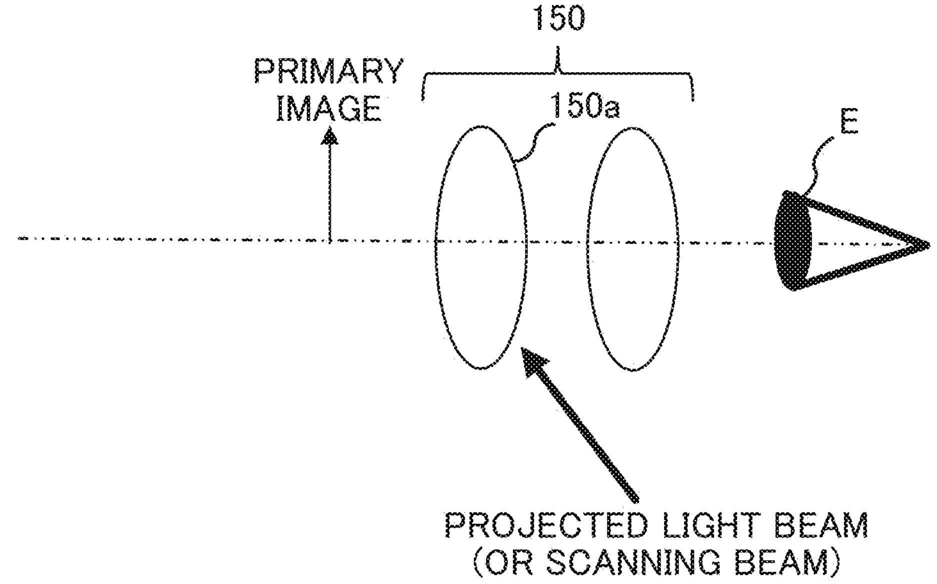
FIG. 17 is a diagram illustrating an eyepiece optical system of an observation apparatus according to a twelfth embodiment.

FIG. 17 is a diagram illustrating an eyepiece optical system 150 of an observation apparatus according to the present embodiment. As illustrated in FIG. 17, the observation apparatus according to the present embodiment uses a refractive surface 150*a* of a lens included in the eyepiece optical system 150, as a combining optical element that combines light beams from the sample S and light beams from the display apparatus 120, in an observation apparatus according to any one of the first to seventh embodiments, for example. The refractive surface 150*a* is coated with a film that lets through a part of light beams from the sample S, and reflects a part of light beams from the display apparatus 120 (light beams from the display apparatus 120 that are projected by the display projection optical system 130), for example. In addition, light beams from the display apparatus 120 may be configured to enter the refractive surface 150*a* as scanning beams to be used in scanning as light rays condensed onto the refractive surface 150*a*.

Figure 18:
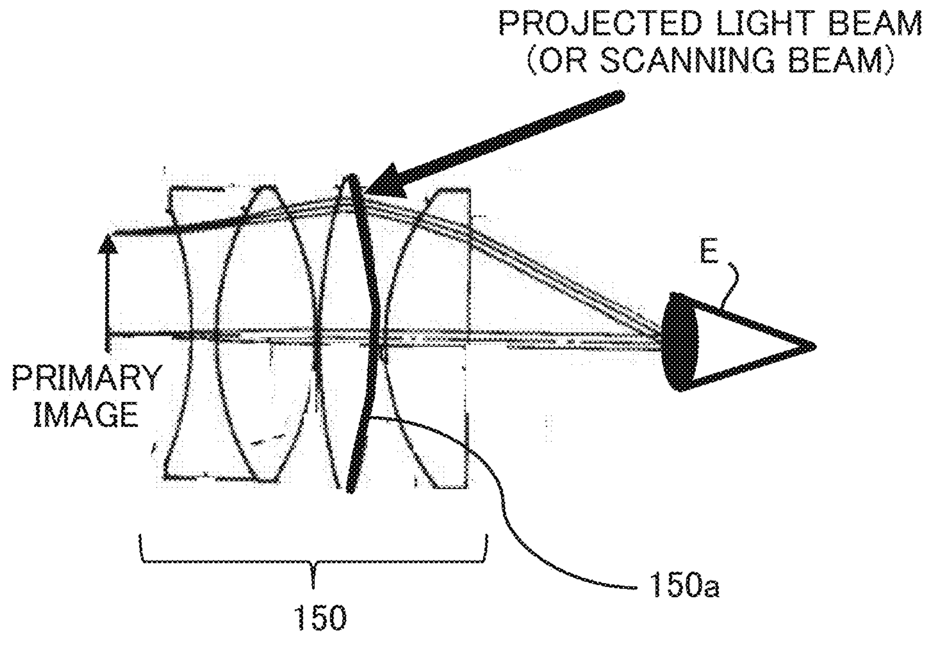
FIG. 18 is a diagram illustrating a specific configuration of the eyepiece optical system of the observation apparatus according to the twelfth embodiment.
Figure 19:
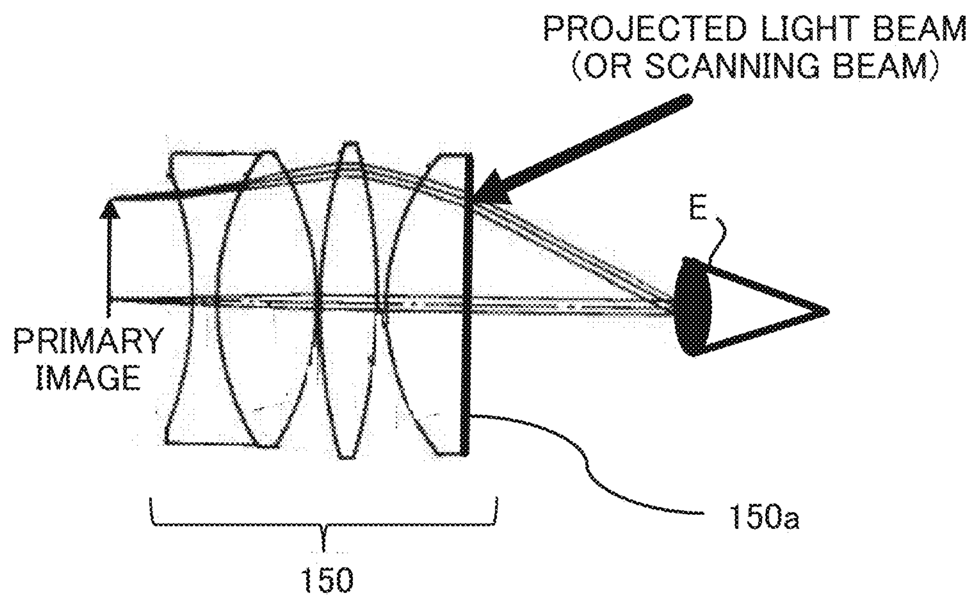
FIG. 19 is a diagram illustrating a specific configuration of the eyepiece optical system of the observation apparatus according to the twelfth embodiment.

FIGS. 18 and 19 are diagrams each illustrating a specific configuration of the eyepiece optical system 150 of the observation apparatus according to the present embodiment. In the eyepiece optical system 150 illustrated in FIG. 18, a refractive surface 150*a* on the observer side of the second lens from the observer side is used as a combining optical element. In the eyepiece optical system 150 illustrated in FIG. 19, a refractive surface 150*a* on the observer side of the first lens from the observer side is used as a combining optical element. In this manner, the refractive surface 150*a* to be used as a combining optical element may be a refractive surface inside the eyepiece optical system 150, or may be a refractive surface closest to the observer. In addition, in the observation apparatus according to the present embodiment, the refractive surface 150*a* of a lens included in the eyepiece optical system 150 is used as a combining optical element, but a refractive surface of a lens included in the observation optical system 110, for example, may be used as a combining optical element.

The observation apparatus having such a configuration also satisfies at least the NA condition, and can obtain the above-described effects caused by the satisfaction.

Thirteenth Embodiment

Figure 20:
FIG. 20 is a diagram illustrating a part of an observation apparatus according to a thirteenth embodiment.
Figure 20:
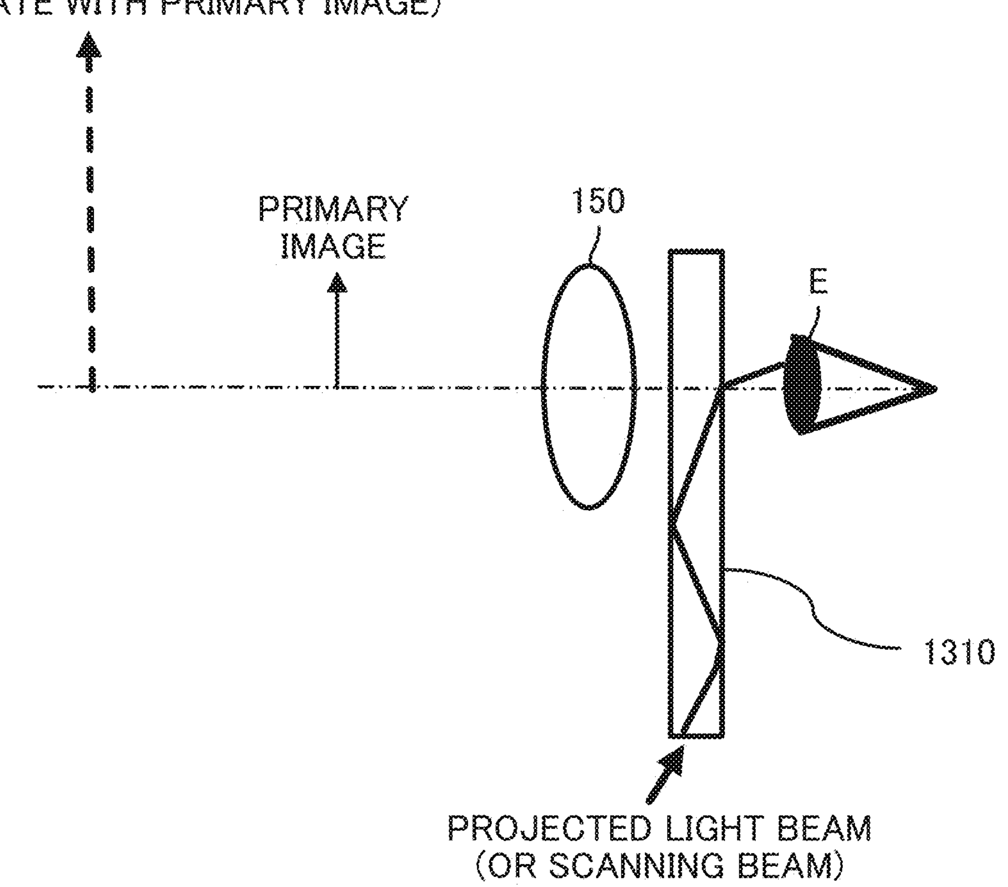

FIG. 20 is a diagram illustrating a part of an observation apparatus according to the present embodiment. As illustrated in FIG. 20, the observation apparatus according to the present embodiment includes a diffractive light guiding element 1310 arranged an optical path between the eyepiece optical system 150 and an eye E of an observer, on which light beams from the sample S become approximately-parallel light beams, and the diffractive light guiding element 1310 is used as a combining optical element that combines light beams from the sample S and light beams from the display apparatus 120, in an observation apparatus according to any one of the first to seventh embodiments, for example.

The diffractive light guiding element 1310 is a hologram light guide plate used in a smart glasses or the like, for example. Light beams from the display apparatus 120 (light beams from the display apparatus 120 that are projected by the display projection optical system 130) enter the diffractive light guiding element 1310, and proceed while repeating diffraction reflection thereinside. Then, the light beams are combined with light beams from the sample S. An image of the sample S and an image of a display pattern are thereby projected onto a retina of an observer or as a virtual image conjugate with a primary image. In addition, light beams from the display apparatus 120 may be configured to enter the refractive surface 150*a* as scanning beam. In this manner, in the observation apparatus according to the present embodiment, after light beams from the sample S pass through the eyepiece optical system 150, light beams from the sample S and light beams from the display apparatus 120 are combined. Thus, the position of an image formed after light beams are combined can also be said to be the position of a virtual image.

Figure 21:
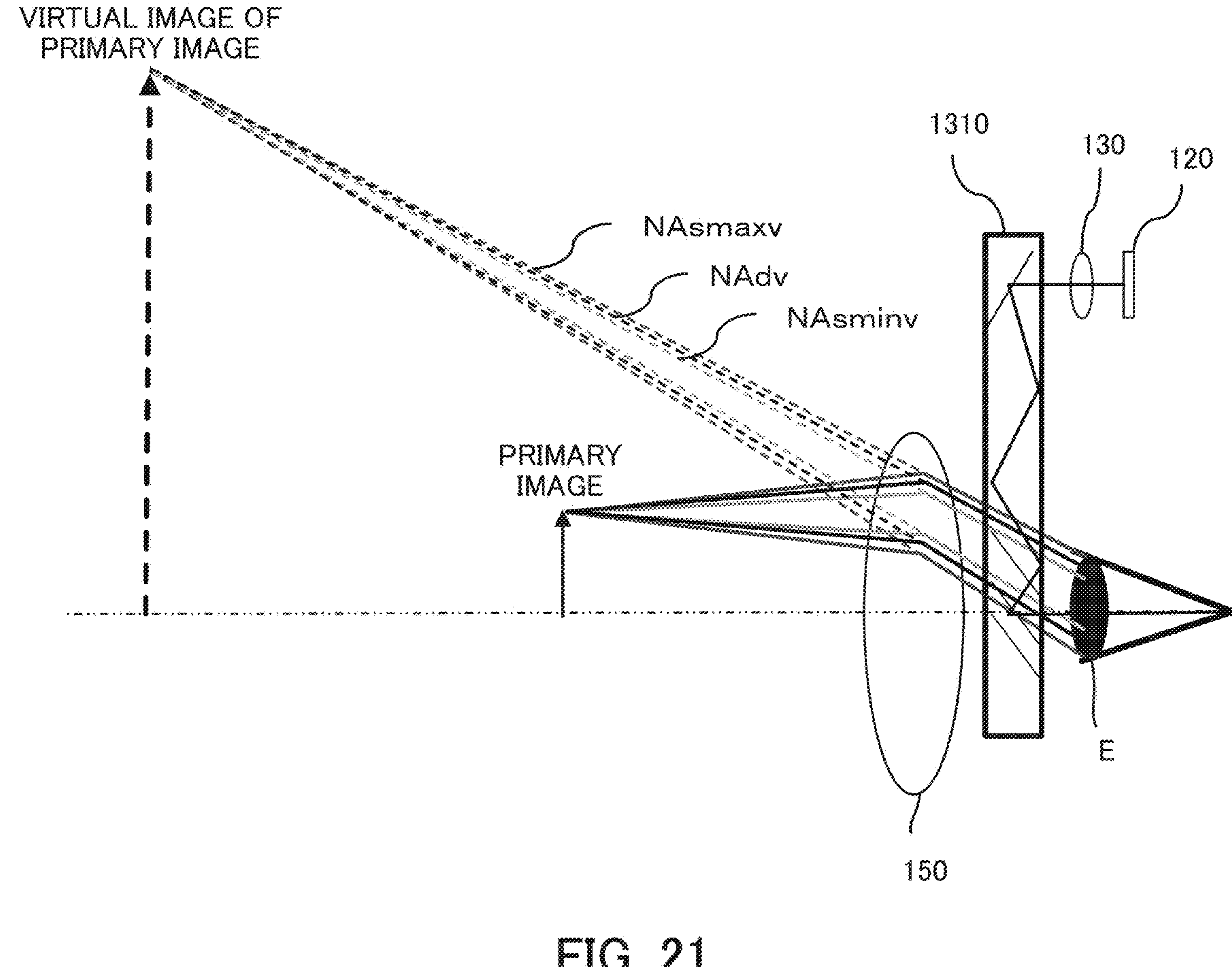
FIG. 21 is a diagram illustrating a state in which the observation apparatus according to the thirteenth embodiment satisfies an NA condition at a position of a virtual image.

FIG. 21 is a diagram illustrating a state in which an observation apparatus according to the present embodiment satisfies an NA condition at a position of a virtual image. FIG. 21 illustrates a state in which NAsminv<NAdv<NAsmaxv is satisfied (i.e., the NA condition is satisfied) at the position of a virtual image, where, among light beams obtained by extending light beams entering the eye E of an observer, assuming that the eyepiece optical system 150 does not exist, a value equivalent to an NA of light beams from the display apparatus 120 is denoted by NAdv, a value equivalent to the maximum value of an NA of light beams from the sample S is denoted by NAsmaxv, and a value equivalent to the minimum value of an NA of light beams from the sample S is denoted by NAsminv. In this manner, the observation apparatus according to the present embodiment also satisfies the NA condition, and can obtain the above-described effects caused by the satisfaction.

Figure 22:
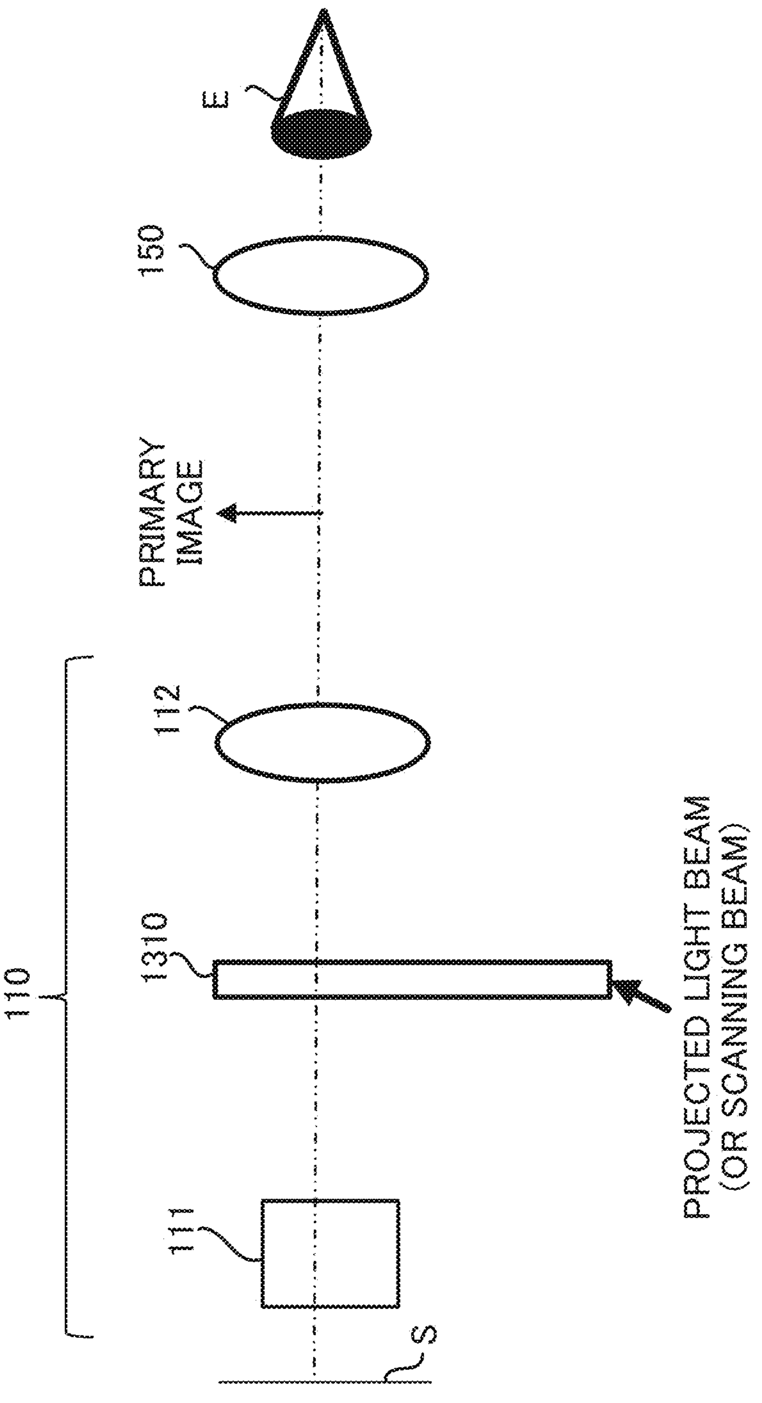
FIG. 22 is a diagram illustrating another arrangement example of a diffractive light guiding element.

In addition, in the observation apparatus according to the present embodiment, an arrangement position of the diffractive light guiding element 1310 is not limited to a position on an optical path between the eyepiece optical system 150 and the eye E of the observer, and may be another position as long as the position exists on an optical path on which light beams from the sample S become approximately-parallel light beams. FIG. 22 is a diagram illustrating another arrangement example of a diffractive light guiding element 1310. In the arrangement example illustrated in FIG. 22, the diffractive light guiding element 1310 is arranged on an optical path between the objective optical system 111 and the imaging optical system 112, on which light beams from the sample S become approximately-parallel light beams.

Fourteenth Embodiment

Figure 23:
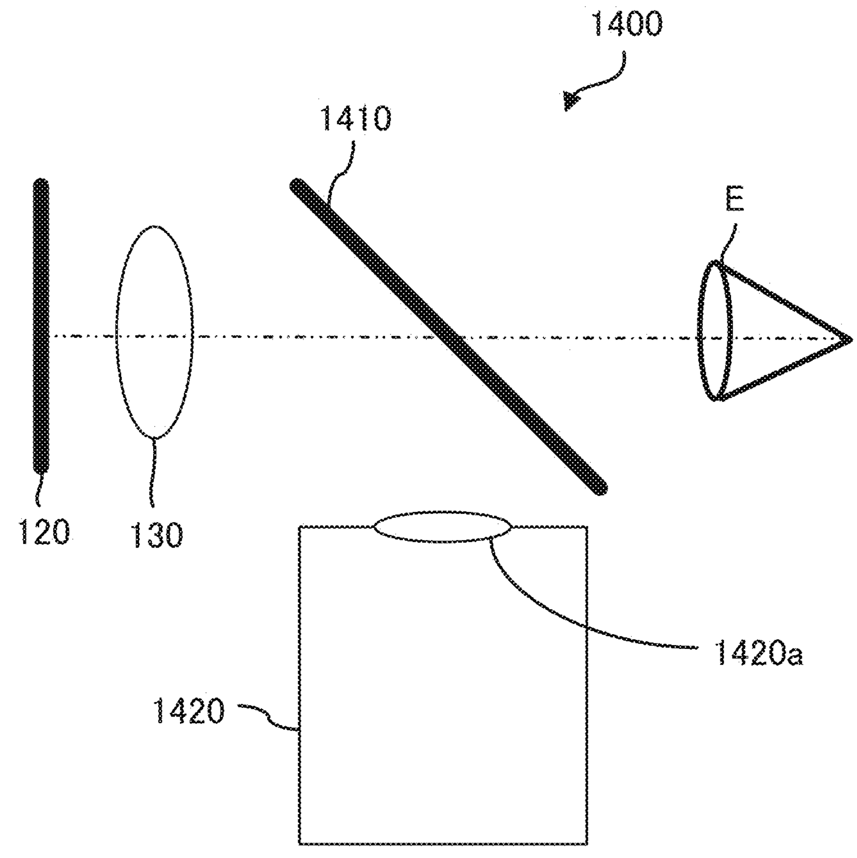
FIG. 23 is a diagram illustrating a configuration of an observation apparatus according to a fourteenth embodiment.

FIG. 23 is a diagram illustrating a configuration of an observation apparatus 1400 according to the present embodiment. As illustrated in FIG. 23, the observation apparatus 1400 includes a dihedral corner reflector array (DCRA) 1410 arranged an optical path between the eyepiece optical system 150 and an eye E of an observer, on which light beams from the sample S become approximately-parallel light beams, and the DCRA 1410 is used as a combining optical element that combines light beams from the sample S and light beams from the display apparatus 120, in an observation apparatus according to any one of the first to seventh embodiments, for example. In addition, FIG. 23 illustrates a component at least including the observation optical system 110 and the eyepiece optical system 150, as a microscope element 1420.

Because the DCRA 1410 relays not only an image but also an exit pupil 1420*a* of the microscope element 1420, by placing a pupil of the eye E at the position of the relayed exit pupil 1420*a*, an observer can observe an image of the sample S. Further, the display apparatus 120 and the display projection optical system 130 are arranged at an opposed position of the eye E of the observer across the DCRA 1410, and the observer can observe an image of a display pattern via the DCRA 1410. The observer can thereby simultaneously observe the image of the sample S and the image of a display pattern. The observation apparatus 1400 having such a configuration also satisfies at least the NA condition, and can obtain the above-described effects caused by the satisfaction.

Fifteenth Embodiment

Figure 24:
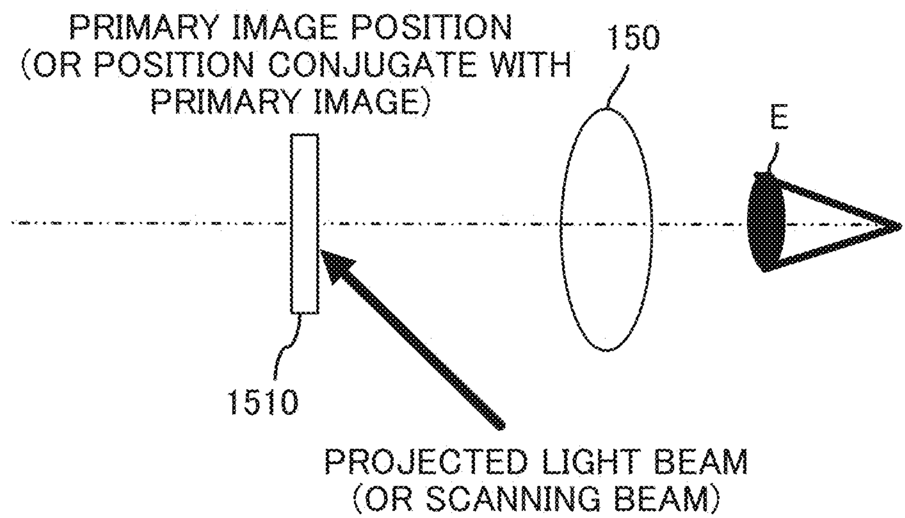
FIG. 24 is a diagram illustrating a part of an observation apparatus according to a fifteenth embodiment.

FIG. 24 is a diagram illustrating a part of an observation apparatus according to the present embodiment. As illustrated in FIG. 24, the observation apparatus according to the present embodiment includes a diffuser panel 1510 arranged at the position of a primary image (or position conjugate with a primary image), and uses the diffuser panel 1510 as a combining optical element that combines light beams from the sample S and light beams from the display apparatus 120, in an observation apparatus according to any one of the first to seventh embodiments, for example.

The diffuser panel 1510 combines light beams from the sample S and light beams from the display apparatus 120, by letting through a part of light beams from the sample S, and reflecting, in a scattering manner, a part of light beams from the display apparatus 120 (light beams from the display apparatus 120 that are projected by the display projection optical system 130). In addition, light beams from the display apparatus 120 may be configured to enter the diffuser panel 1510 as scanning beam.

The observation apparatus having such a configuration also satisfies at least the NA condition, and can obtain the above-described effects caused by the satisfaction.

Sixteenth Embodiment

Figure 25:
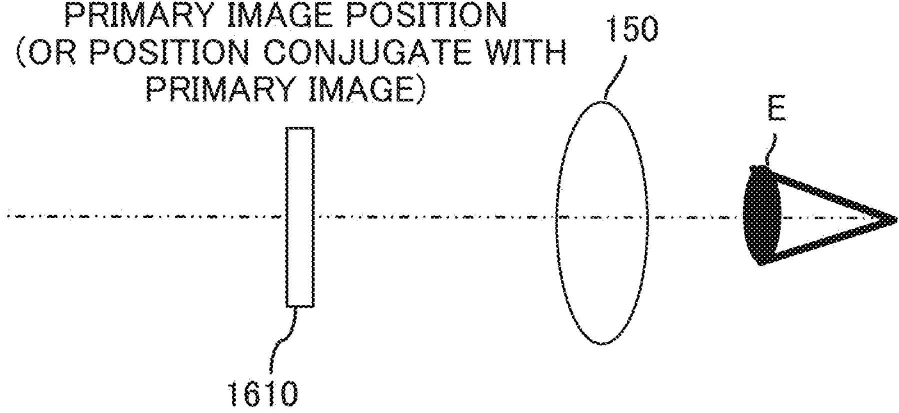
FIG. 25 is a diagram illustrating a part of an observation apparatus according to a sixteenth embodiment.

FIG. 25 is a diagram illustrating a part of an observation apparatus according to the present embodiment. As illustrated in FIG. 25, the observation apparatus according to the present embodiment includes a transmissive display apparatus 1610 connected to a PC and arranged at the position of a primary image (or position conjugate with a primary image), and uses the transmissive display apparatus 1610 in place of the display apparatus 120, the display projection optical system 130, and the combining optical element 140, in an observation apparatus according to any one of the first to seventh embodiments, for example. The transmissive display apparatus 1610 includes a plurality of two-dimensionally arranged luminous points, and displays various display patterns by the PC controlling lighting on/off, luminance, and the like of each luminous point. The transmissive display apparatus 1610 is an organic electro luminescence (EL) or a micro light emitting diode (LED), for example. The observer can thereby simultaneously observe an image of the sample S and an image of a display pattern displayed by the transmissive display apparatus 1610.

The above embodiments are specific examples for facilitating understanding of the invention, and the present invention is not limited to these embodiments. Modifications obtained by modifying the above embodiments and alternative forms replacing the above embodiments can be included. In other words, in each embodiment, the components can be modified without departing from the spirit and the scope thereof. Further, a new embodiment can be implemented by appropriately combining the multiple components disclosed in one or more of the embodiments. Further, some components may be omitted from the components described in the corresponding embodiment, or some components may be added to the components described in the embodiment. That is, the observation apparatus of the present invention can be variously modified and changed without departing from the scope of the invention defined by the claims.

In the above-described embodiment, the observation optical system 110 (more specifically, the objective optical systems 111 and 311) may further includes a zooming optical system that changes observation magnification. Further, not only the observation apparatuses 100 and 400, but also the other observation apparatuses according to the above-described embodiments may be microscopes.

What is claimed is:

1. An observation apparatus comprising:

an observation optical system configured to image a light beam from a sample, and to form an image of the sample;

a display apparatus configured to display a display pattern;

a display projection optical system configured to project a light beam from the display apparatus, and to form an image of the display pattern at a position at which the image of the sample is formed;

a combining optical element configured to combine the light beam from the sample and the light beam from the display apparatus; and an eyepiece optical system through which an image of the sample and an image of the display pattern are simultaneously observable by an observer, wherein a numerical aperture (NA) of the light beam from the display apparatus is smaller than a maximum value of an NA of the light beam from the sample, and is larger than a minimum value of the NA of the light beam from the sample, at a position of an image on an optical path that is formed after the light beam from the sample and the light beam from the display apparatus are combined by the combining optical element.

2. The observation apparatus according to claim 1, wherein the image on the optical path that is formed after the light beam from the sample and the light beam from the display apparatus are combined by the combining optical element includes a virtual image formed by the eyepiece optical system.

3. The observation apparatus according to claim 1, further comprising:

an image sensor configured to capture an image of the sample;

an image capturing optical system configured to image a light beam from the sample onto the image sensor; and a splitting optical element configured to guide at least a part of light beams from the sample to the image sensor, wherein the splitting optical element is arranged on an optical path between the sample and the combining optical element.

4. The observation apparatus according to claim 3, wherein the observation apparatus satisfies the following conditional expression (2):

$$0.5 < Dc/Do < 2.0, \quad (2)$$

where an imaging range on the sample that is generated by the image sensor is denoted by Dc, and an observation range on the sample that is generated by the observation optical system is denoted by Do.

5. The observation apparatus according to claim 3, wherein the observation apparatus satisfies the following conditional expression (3):

$$Ppro \times MGpro > Pc \times MGo/MGc, \quad (3)$$

where a size of each pixel of the display apparatus is denoted by Ppro, a size of each pixel of the image sensor is denoted by Pc, a projection magnification from the sample to the image sensor is denoted by MGc, a projection magnification from the display apparatus to a position of an image of the sample is denoted by MGpro, and a projection magnification from the sample to the position of the image of the sample is denoted by Mgo.

6. The observation apparatus according to claim 1, wherein:

the observation optical system includes:

an objective optical system configured to convert light beams from the sample into approximately-parallel light beams; and an imaging optical system configured to image the approximately-parallel light beams, and form the image of the sample that is formed by the observation optical system, and the combining optical element is arranged on an optical path between the objective optical system and the imaging optical system.

7. The observation apparatus according to claim 1, further comprising an eye separation optical element configured to split light beams to both left and right eyes of the observer, wherein the eye separation optical element is arranged closer to the observer than the combining optical element.

8. The observation apparatus according to claim 6, further comprising a display splitting optical element configured to split light beams from the display apparatus, wherein the display splitting optical element is arranged closer to the display apparatus than the combining optical element.

9. The observation apparatus according to claim 1, wherein the combining optical element is a refractive surface of a lens included in the observation optical system or the eyepiece optical system, and reflects a part of light beams from the display apparatus and lets through a part of light beams from the sample.

10. The observation apparatus according to claim 1, wherein the combining optical element is a diffractive light guiding element arranged in approximately-parallel light beams.

11. The observation apparatus according to claim 10, wherein:

the observation optical system includes:

an objective optical system configured to convert light beams from the sample into approximately-parallel light beams; and an imaging optical system configured to image the approximately-parallel light beams, and form the image of the sample that is formed by the observation optical system, and the combining optical element is arranged on an optical path between the objective optical system and the imaging optical system.

12. The observation apparatus according to claim 10, wherein the combining optical element is arranged on an optical path between the eyepiece optical system and an eye of the observer.

13. The observation apparatus according to claim 1, wherein the combining optical element is a dihedral corner reflector array (DCRA) arranged in approximately-parallel light beams.

14. The observation apparatus according to claim 1, wherein the combining optical element is a diffuser panel configured to let through a part of light beams from the sample and reflect, in a scattering manner, a part of light beams from the display apparatus, and is arranged at a position of an image of the sample that is formed by the observation optical system, or a position conjugate with the position.

15. The observation apparatus according to claim 1, wherein:

the observation optical system includes a plurality of objective lenses having different magnifications, and an objective lens inserted into an optical path is selectable from among the plurality of objective lenses.

16. The observation apparatus according to claim 1, wherein the observation optical system includes a zooming optical system.

17. The observation apparatus according to claim 1, wherein the observation apparatus comprises a microscope.

18. The observation apparatus according to claim 1, wherein:

the observation optical system includes a plurality of objective lenses different from one another in at least one of magnification and NA, and the maximum value of the NA of the light beam from the sample and the minimum value of the NA of the light beam from the sample are determined by the magnifications and the NAs of the plurality of objective lenses.

* * * * *